(12) United States Patent
Han et al.

(10) Patent No.: US 9,716,466 B2
(45) Date of Patent: Jul. 25, 2017

(54) POWER CONVERSION APPARATUS, PHOTOVOLTAIC MODULE AND COMMUNICATION DEVICE AND PHOTOVOLTAIC SYSTEM INCLUDING THE SAME

(71) Applicant: LG ELECTRONICS INC., Seoul (KR)

(72) Inventors: Dongho Han, Seoul (KR); Myonghwan Kim, Seoul (KR); Myungsoo Ham, Seoul (KR); Hyunho Do, Seoul (KR)

(73) Assignee: LG Electronics Inc., Seoul (KR)

( * ) Notice: Subject to any disclaimer, the term of this patent is extended or adjusted under 35 U.S.C. 154(b) by 274 days.

(21) Appl. No.: 14/479,120

(22) Filed: Sep. 5, 2014

(65) Prior Publication Data

US 2015/0207456 A1 Jul. 23, 2015

(30) Foreign Application Priority Data

Jan. 23, 2014 (KR) .................. 10-2014-0008560
Feb. 10, 2014 (KR) .................. 10-2014-0015027

(51) Int. Cl.
*H02M 3/24* (2006.01)
*H02S 40/32* (2014.01)
(Continued)

(52) U.S. Cl.
CPC .............. *H02S 40/32* (2014.12); *H02J 3/383* (2013.01); *H02J 13/0031* (2013.01);
(Continued)

(58) Field of Classification Search
CPC . H02M 3/33507; H02M 3/33523; H02M 7/48
(Continued)

(56) References Cited

U.S. PATENT DOCUMENTS 8,498,513 B2 * 7/2013 Kim ................... H04N 21/2383
370/252
2008/0273356 A1 * 11/2008 Melanson ........... H02M 1/4225
363/47
(Continued)

FOREIGN PATENT DOCUMENTS

CN 102231609 A * 11/2011 .............. H02J 3/383
WO WO 2013/004110 A1 1/2013

OTHER PUBLICATIONS

Chen et al., "Research of OFDM Power Line Carrier Communication Based on AMI", Electrical, Communications, and Computers, 2009, Feb. 28, 2009, pp. 278-281.
(Continued)

*Primary Examiner* — Adolf Berhane
*Assistant Examiner* — Afework Demisse
(74) *Attorney, Agent, or Firm* — Birch, Stewart, Kolasch & Birch, LLP

(57) ABSTRACT

A power conversion apparatus, a photovoltaic module, and a communication device and a photovoltaic system including the same are discussed. The power conversion apparatus includes an inverter unit to perform alternating current (AC) voltage conversion based on direct current (DC) voltage from a solar cell module, a controller to control the inverter unit, and a communication unit to add a carrier frequency signal containing predetermined information to the converted AC voltage and output the AC voltage containing the predetermined information to a grid and, when a level of the converted AC voltage is equal to or less than a predetermined level, to add the carrier frequency signal containing the predetermined information to DC voltage and output the DC voltage containing the predetermined information to the grid. Consequently, it is possible to stably transmit information.

15 Claims, 23 Drawing Sheets

(51) Int. Cl.
*H02S 40/34* (2014.01)
*H04B 3/54* (2006.01)
*H02J 3/38* (2006.01)
*H02M 7/48* (2007.01)
*H02J 13/00* (2006.01)
*H02M 3/28* (2006.01)
*H02M 1/00* (2006.01)

(52) U.S. Cl.
CPC ............... *H02M 7/48* (2013.01); *H02S 40/34* (2014.12); *H04B 3/54* (2013.01); *H02M 3/285* (2013.01); *H02M 2001/007* (2013.01); *H04B 2203/5416* (2013.01); *Y02E 10/563* (2013.01); *Y02E 40/72* (2013.01); *Y04S 10/123* (2013.01)

(58) Field of Classification Search
USPC .......................................................... 363/95
See application file for complete search history.

(56) References Cited

U.S. PATENT DOCUMENTS

| | | |
|---|---|---|
| 2012/0081933 A1 | 4/2012 | Garrity |
| 2012/0191263 A1* | 7/2012 | Kuniyosi ............... H02J 3/383 700/286 |
| 2012/0325288 A1 | 12/2012 | Jang et al. |
| 2013/0034172 A1 | 2/2013 | Pettler et al. |

OTHER PUBLICATIONS

Garcia-Baleon et al., "A Power-Line Communication Modem based on OFDM", 2009 International Conference on Electrical, Communications, and Computers, Feb. 26, 2009, pp. 208-213.

\* cited by examiner

POWER CONVERSION APPARATUS, PHOTOVOLTAIC MODULE AND COMMUNICATION DEVICE AND PHOTOVOLTAIC SYSTEM INCLUDING THE SAME

CROSS-REFERENCE TO RELATED APPLICATION

This application claims the priority benefit of Korean Patent Application No. 10-2014-0015027, filed on Feb. 10, 2014 and 10-2014-0008560, filed on Jan. 23, 2014 in the Korean Intellectual Property Office, the disclosure of which is incorporated herein by reference.

BACKGROUND OF THE INVENTION

1. Field of the Invention

The embodiments of the invention relates to a power conversion apparatus, a photovoltaic module, and a communication device and a photovoltaic system including the same and, more particularly, to a power conversion apparatus, a photovoltaic module, and a communication device that are capable of stably transmitting information and a photovoltaic system including the same.

2. Description of the Related Art

In recent years, exhaustion of existing energy resources, such as petroleum and coal, has been forecast with the result that interest in alternative energy resources substituting for the existing energy resources has risen. Among such alternative energy resources is a solar cell that directly converts photovoltaic energy into electrical energy using a semiconductor device, which is in the spotlight as a next-generation cell.

A photovoltaic module includes a plurality of solar cells connected in series or in parallel to each other for photovoltaic power generation. The photovoltaic module may include a junction box to collect electricity produced by the solar cells.

SUMMARY OF THE INVENTION

It is an object of the embodiment of the invention to provide a power conversion apparatus, a photovoltaic module, and a communication device that are capable of stably transmitting information and a photovoltaic system including the same.

In accordance with an aspect of the embodiment of the invention, the above and other objects can be accomplished by the provision of a power conversion apparatus including an inverter unit to perform alternating current (AC) voltage conversion based on direct current (DC) voltage from a solar cell module, a controller to control the inverter unit, and a communication unit to add a carrier frequency signal containing predetermined information to the converted AC voltage and output the AC voltage containing the information to a grid and, when a level of the converted AC voltage is equal to or less than a predetermined level, to add the carrier frequency signal containing the predetermined information to DC voltage and output the DC voltage containing the predetermined information to the grid.

In accordance with another aspect of the embodiment of the invention, there is provided a photovoltaic module including a solar cell module including a plurality of solar cells and a junction box attached to a rear surface of the solar cell module, the junction box including a power conversion module to power-convert DC voltage supplied from the solar cell module and to output the power-converted DC voltage, wherein the power conversion module includes at least one bypass diode to receive the DC voltage from the solar cell module, a converter unit to convert the DC voltage from the at least one bypass diode, the converter unit including a plurality of interleaving converters, an inverter unit to output AC voltage using the converted DC voltage, a controller to control the inverter unit, and a communication unit to add a carrier frequency signal containing predetermined information to the AC voltage and output the AC voltage containing the predetermined information to a grid and, when a level of the converted AC voltage is equal to or less than a predetermined level, to add the carrier frequency signal containing the predetermined information to DC voltage and output the DC voltage containing the predetermined information to the grid.

In accordance with another aspect of the embodiment of the invention, there is provided a communication device including a first communication unit to receive AC voltage having information regarding photovoltaic power added thereto through a grid, a memory to store the information regarding the photovoltaic power, information regarding current and voltage of a power conversion module connected to a solar cell module, and information regarding a state of the grid, and a second communication unit to output monitoring information including at least one selected from among the information regarding the photovoltaic power, the information regarding the current and voltage of the power conversion module, and the information regarding the state of the grid to an external device.

In accordance with a further aspect of the embodiment of the invention, there is provided a photovoltaic system including a solar cell module including a plurality of solar cells, a power conversion module to power-convert DC voltage supplied from the solar cell module into AC voltage and to output the AC voltage, and a communication device including a first communication unit to receive AC voltage having information regarding photovoltaic power added thereto through a grid, a memory to store the information regarding the photovoltaic power, information regarding current and voltage of the power conversion module, and information regarding a state of the grid, and a second communication unit to output monitoring information including at least one selected from among the information regarding the photovoltaic power, the information regarding the current and voltage of the power conversion module, and the information regarding the state of the grid to an external device.

BRIEF DESCRIPTION OF THE DRAWINGS

The above and other objects, features and other advantages of the embodiments of the invention will be more clearly understood from the following detailed description taken in conjunction with the accompanying drawings, in which.

DETAILED DESCRIPTION OF THE EMBODIMENTS

Reference will now be made in detail to the example embodiments of the invention, examples of which are illustrated in the accompanying drawings.

The terms "module" and "unit," when attached to the names of components are used herein to help the understanding of the components and thus they should not be considered as having specific meanings or roles. Accordingly, the terms "module" and "unit" may be used interchangeably.

Figure 1:
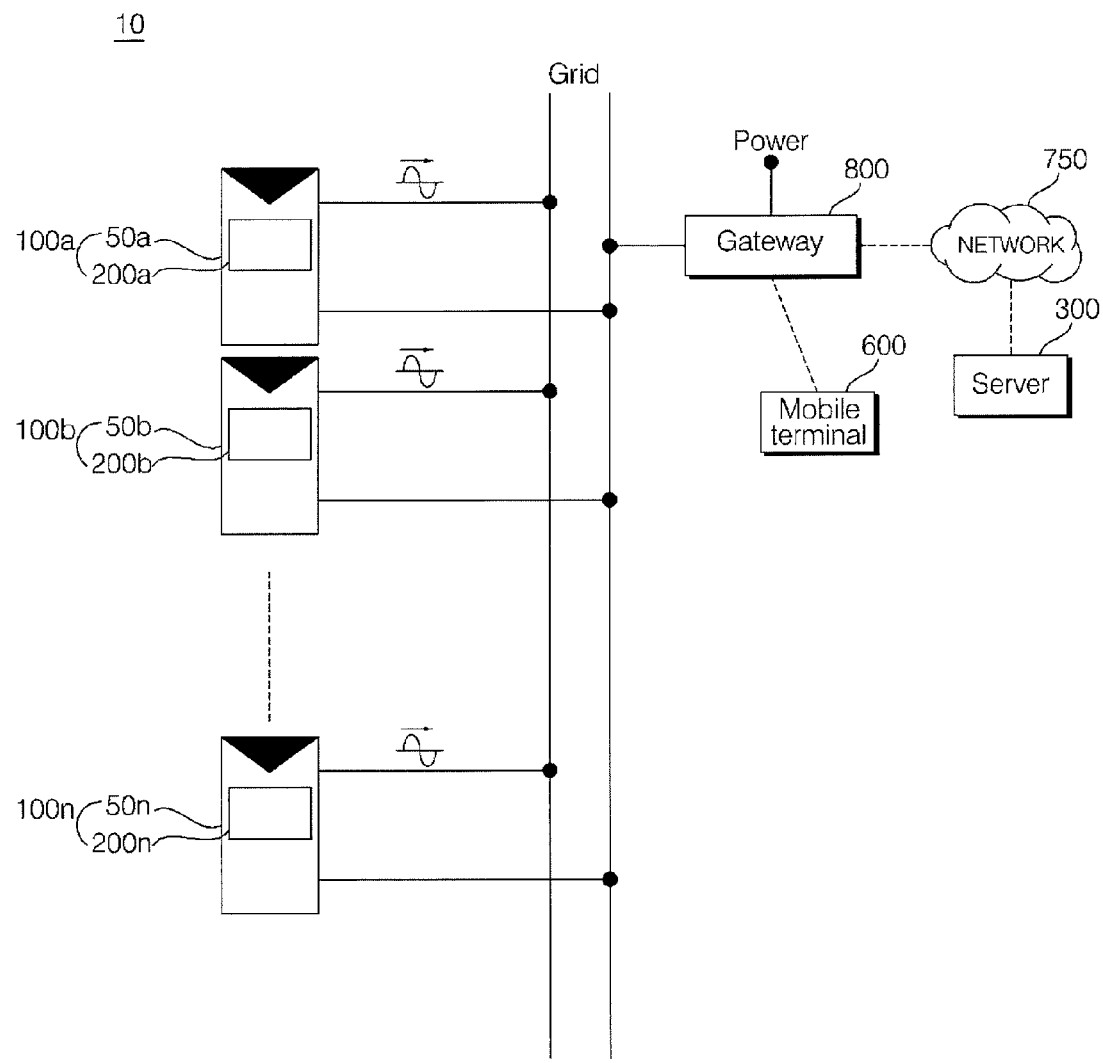
FIG. 1 is a view showing an example of the construction of a photovoltaic system according to an embodiment of the invention.

FIG. 1 is a view showing an example of the construction of a photovoltaic system according to an embodiment of the invention.

Referring to FIG. 1, the photovoltaic system 10 according to the embodiment of the invention may include a plurality of photovoltaic modules 50a, 50b, . . . , and 50n, a communication device 800 to communicate with the photovoltaic modules 50a, 50b, . . . , and 50n through a grid, a server 300 to exchange data with the communication device 800 over a network 750, and a mobile terminal 600 to exchange data with the communication device 800 or the server 300.

Each of the photovoltaic modules 50a, 50b, . . . , and 50n may respectively include solar cell modules 100a, 100b, . . . , and 100n, each of which includes a plurality of solar cells, to generate direct current (DC) voltage and junction boxes 200a, 200b, . . . , and 200n attached to rear surfaces of the solar cell modules 100a, 100b, . . . , and 100n to convert the DC voltage generated by the solar cell modules 100a, 100b, . . . , and 100n into alternating current (AC) voltage and to output the converted AC voltage.

The junction boxes 200a, 200b, . . . , and 200n each may include a power conversion module 700 (see FIG. 6) to convert the DC voltage generated by the solar cell modules 100a, 100b, . . . , and 100n into AC voltage and to output the converted AC voltage.

The power conversion module 700 (see FIG. 6) may include bypass diodes Da, Db, and Dc, a converter unit 530 (see FIG. 6), an inverter unit 540 (see FIG. 6), and a communication unit 570 (see FIG. 6) disposed on a circuit board. For this reason, the power conversion module 700 (see FIG. 6) may be referred to as a micro inverter.

In the embodiment of the invention, on the other hand, the photovoltaic modules 50a, 50b, . . . , and 50n may directly output AC voltage through the solar cell modules 100a, 100b, . . . , and 100n and the junction boxes 200a, 200b, . . . , and 200n. For this reason, the photovoltaic modules 50a, 50b, . . . , and 50n may be referred to as photovoltaic AC modules.

In the structure as described above, the micro inverter to output AC voltage is attached to each of the solar cell modules 100a, 100b, . . . , and 100n. Even when output power of any one of the solar cell modules 100a, 100b, . . . , and 100n is lowered, therefore, the generated AC voltage may be supplied to a grid since the photovoltaic modules 50a, 50b, . . . , and 50n are connected in parallel to one another.

Unlike a string mode in which the photovoltaic modules 50a, 50b, . . . , and 50n are connected in series to one another, the photovoltaic modules 50a, 50b, . . . , and 50n independently generate and output AC voltage. In addition, the photovoltaic modules 50a, 50b, . . . , and 50n may stably output AC voltage to the grid irrespective of output of AC voltage from other photovoltaic modules since the photovoltaic modules 50a, 50b, . . . , and 50n are connected in parallel to one another.

Figure 6:
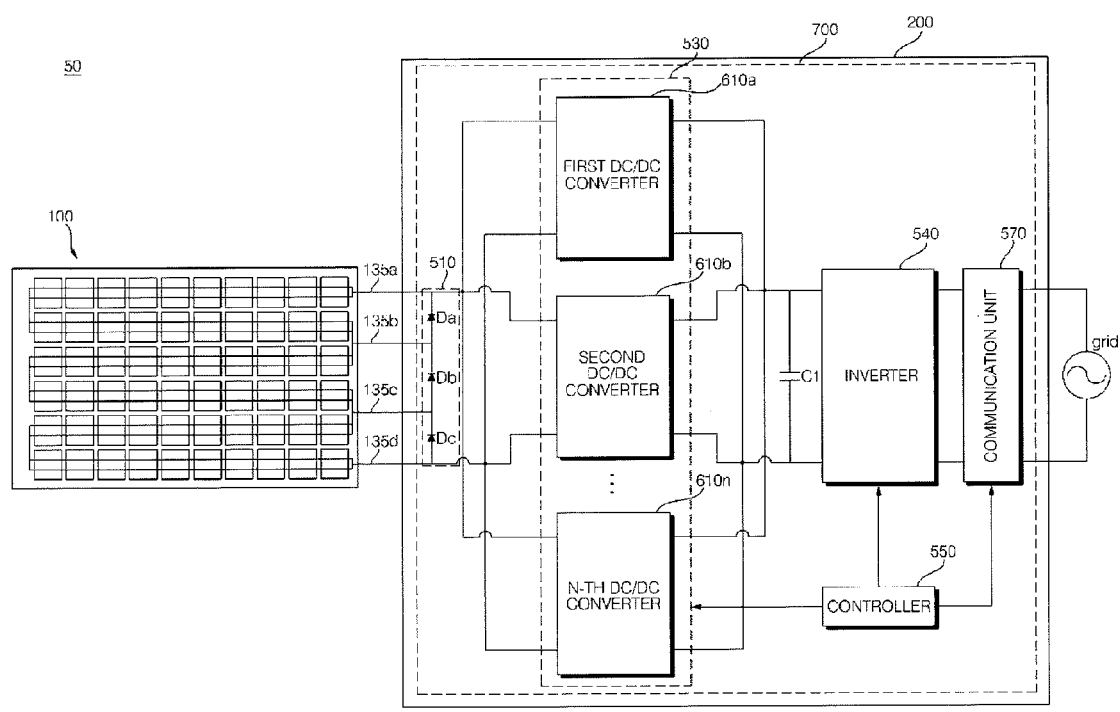
FIG. 6 is a block diagram of an example of a power conversion module in a junction box shown in FIG. 2.

In the embodiment of the invention, on the other hand, the power conversion module 700 (see FIG. 6) may output information regarding power generated by the photovoltaic modules to an external grid through the communication unit 570 (see FIG. 6).

The communication unit 570 (see FIG. 6) may output AC voltage converted by the inverter unit 540 (see FIG. 6) to the grid through power line communication (PLC) in a state in which a carrier frequency signal containing predetermined information is added to the AC voltage.

When a level of the converted AC voltage is equal to or less than a predetermined level, on the other hand, the communication unit 570 (see FIG. 6) may output predetermined DC voltage to the grid in a state in which a carrier frequency signal containing information is added to the DC voltage.

For example, when the photovoltaic modules do not generate DC voltage and, therefore, there is no converted AC voltage, the communication unit 570 (see FIG. 6) may output additional DC voltage to the grid in a state in which a carrier frequency signal containing information is added to the DC voltage. Alternatively, the communication unit 570 (see FIG. 6) may output DC voltage having a level of 0 to the grid in a state in which a carrier frequency signal containing information is added to the DC voltage. Even when DC voltage is not generated or a level of the AC voltage is equal to or less than a predetermined level, therefore, it is possible to perform communication through the grid.

Meanwhile, the communication unit 570 (see FIG. 6) may perform one-way communication and, therefore, the power conversion module 700 (see FIG. 6) may be simply configured.

The communication device 800 may receive information from the photovoltaic modules 50a, 50b, . . . , and 50n through power line communication (PLC). That is, the communication device 800 may receive information from the photovoltaic modules 50a, 50b, . . . , and 50n through the grid and perform signal processing for the receive information.

Figure 16:
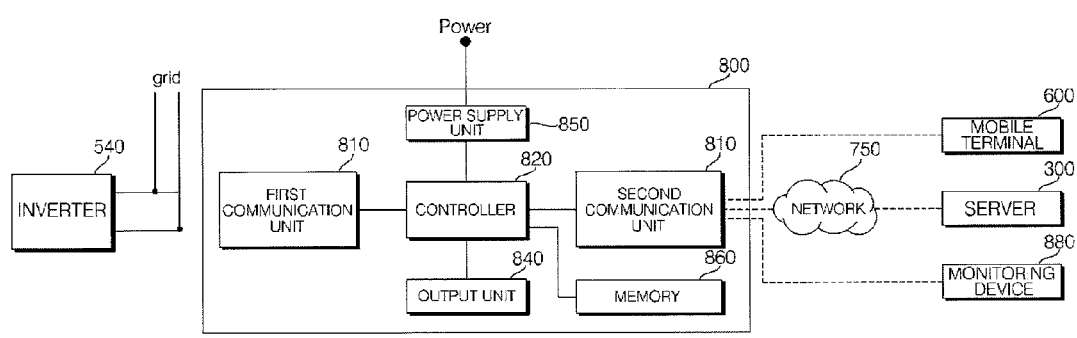
FIG. 16 is an internal block diagram of an example of a communication device shown in FIG. 1.

To this end, the communication device 800 may include a first communication unit 810 (see FIG. 16), a controller 820 (see FIG. 16), a second communication unit 830 (see FIG. 16), an output unit 840 (see FIG. 16), and a power supply unit 850 (see FIG. 16).

The first communication unit 810 (see FIG. 16) may receive information from the photovoltaic modules 50a, 50b, . . . , and 50n through power line communication and transmit the received information to the controller 820.

The power line communication may be high-speed power line communication (PLC) which is robust to noise. That is, the communication unit 570 in each of the photovoltaic modules 50a, 50b, . . . , and 50n may output information to the grid based on a communication speed of 1 Mbps or higher and a bandwidth of 2 to 30 MHz. The first communication unit 810 may receive the information.

In addition, the first communication unit 810 (see FIG. 16) may separate a carrier frequency signal from the received AC voltage and extract information from the carrier frequency signal. The extracted information may be transmitted to the controller 820 (see FIG. 16).

The controller 820 (see FIG. 16) may control the received information to be signal-processed and may control the signal-processed information to be displayed as an image or to be output as a sound.

On the other hand, the controller 820 (see FIG. 16) may control the received information to be transmitted to an external device through the second communication unit 830 (see FIG. 16). For example, the controller 820 (see FIG. 16) may control the received information to be transmitted to the mobile terminal 600 or may control the received information to be transmitted to the server 300 or the mobile terminal 600 over the network 750.

Meanwhile, the power supply unit 850 may receive additional voltage from an external device. Even when no AC voltage is applied to the grid, therefore, it is possible to receive information from the photovoltaic modules 50a, 50b, . . . , and 50n. Even when no AC voltage is applied to the grid and no AC voltage is output from the photovoltaic modules 50a, 50b, . . . , and 50n, on the other hand, it is possible to receive information based on DC voltage. Consequently, it is possible to stably receive information.

The server 300 or the mobile terminal 600 may receive information regarding photovoltaic power for a building in which the photovoltaic modules 50a, 50b, . . . , and 50n are installed or information regarding photovoltaic power corresponding to each module from the second communication unit 830 (see FIG. 16) of the communication device 800. Consequently, it is possible to easily and conveniently check information regarding photovoltaic power generated per building or per module.

Meanwhile, the server 300 may be an electric power company server, a provider server to provide information regarding electric power, or a server of a photovoltaic module manufacturing company.

Figure 2:
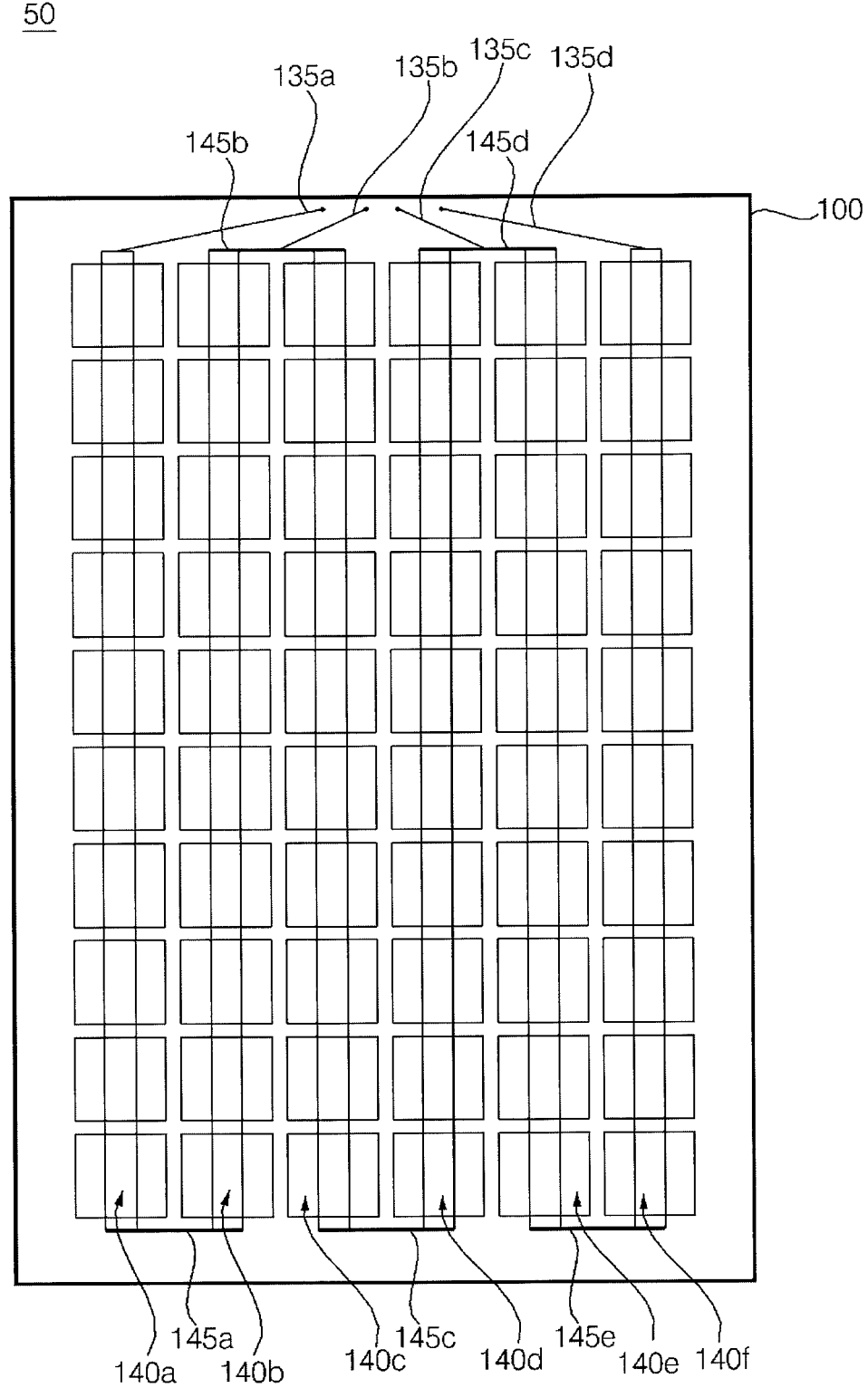
FIG. 2 is a front view showing a photovoltaic module according to an embodiment of the invention.
Figure 3:
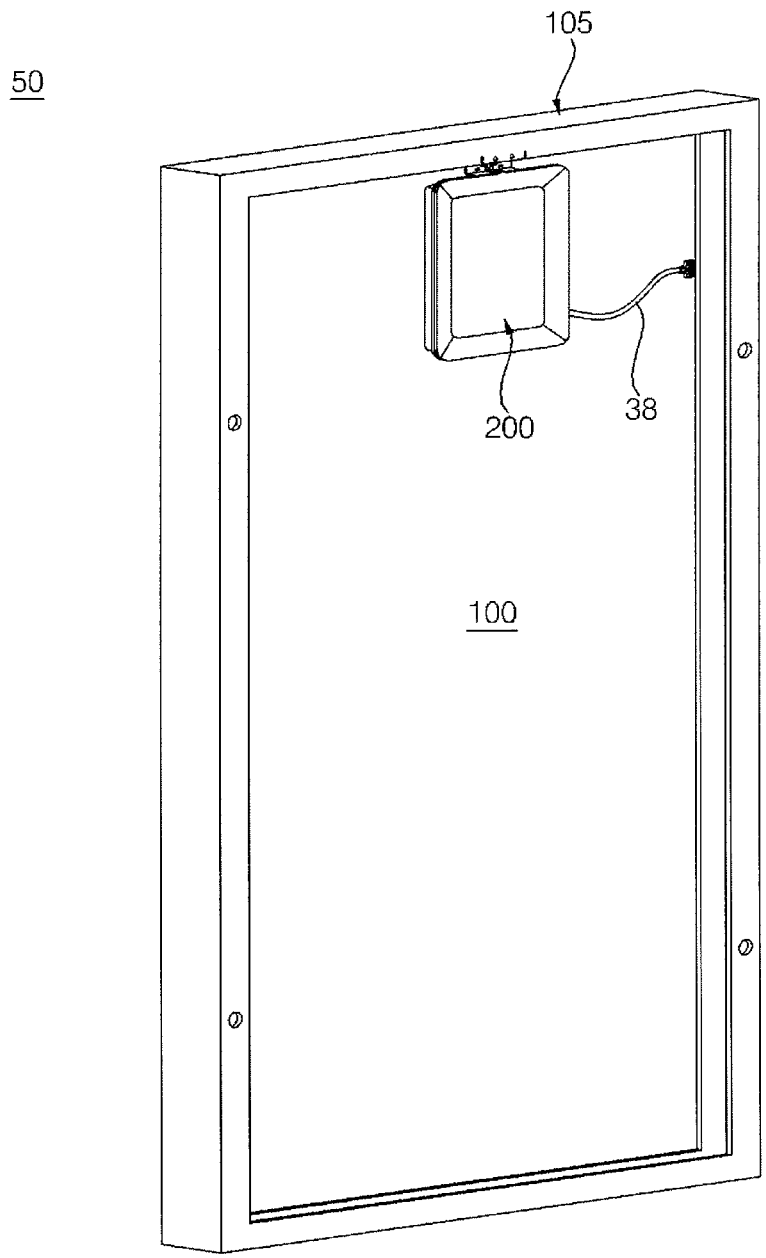
FIG. 3 is a rear view showing the photovoltaic module of FIG. 2.
Figure 4:
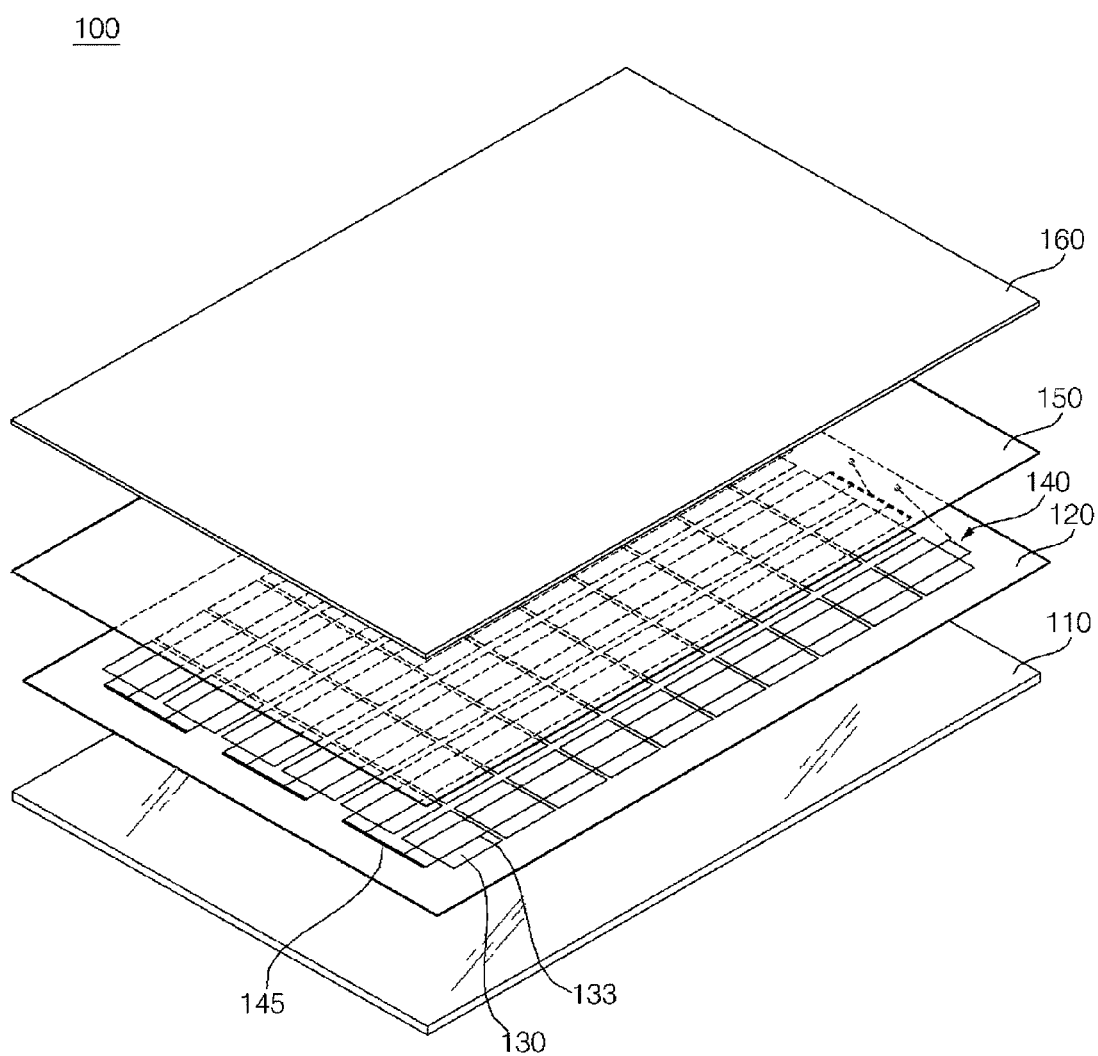
FIG. 4 is an exploded perspective view of a solar cell module shown in FIG. 2.

FIG. 2 is a front view showing a photovoltaic module according to an embodiment of the invention, FIG. 3 is a rear view showing the photovoltaic module of FIG. 2 and FIG. 4 is an exploded perspective view of a solar cell module shown in FIG. 2.

Referring to FIGS. 2 to 4, the photovoltaic module 50 according to the embodiment of the invention includes a solar cell module 100 and a junction box 200 disposed at one surface of the solar cell module 100. In addition, the photovoltaic module 50 may further include a heat dissipation member disposed between the solar cell module 100 and the junction box 200.

The solar cell module 100 may include a plurality of solar cells 130. In addition, the solar cell module 100 may further include a first sealing member 120 disposed at the lower surface of each of the solar cells 130, a second sealing member 150 disposed at the upper surface of each of the solar cells 130, a rear substrate 110 disposed at the lower surface of the first sealing member 120, and a front substrate 160 disposed at the upper surface of the second sealing member 150.

Each of the solar cells 130 is a semiconductor device to convert solar energy into electrical energy. A silicon solar cell, a compound semiconductor solar cell, a tandem solar cell, a dye-sensitized solar cell, CdTe type solar cell, or a CIGS type solar cell may be used as each of the solar cells 130.

Each of the solar cells 130 has a light receiving surface on which solar light is incident and a back surface opposite to the light receiving surface. For example, each of the solar cells 130 includes a first conductive type silicon substrate, a second conductive type semiconductor layer formed on the silicon substrate, the second conductive type being opposite to the first conductive type, and at least one opening through which a portion of the second conductive type semiconductor layer is exposed. In addition, each of the solar cells 130 may further include an anti-reflection film formed on the second conductive type semiconductor layer, a front electrode contacting the portion of the second conductive type semiconductor layer exposed through the at least one opening, and a rear electrode formed at the rear surface of the silicon substrate.

The solar cells 130 may be electrically connected in series or in parallel to each other. Specifically, the solar cells 130 may be electrically connected to each other via ribbons 133. Each of the ribbons 133 may be bonded to the front electrode formed on the light receiving surface of one of the solar cells 130 and the rear electrode formed on the back surface of another adjacent one of the solar cells 130.

Referring to FIGS. 2 to 4, the ribbons 133 are arranged in two rows and the solar cells 130 are connected in a line by the ribbons 133 to form one solar cell string 140. As shown in FIGS. 2 to 4, six solar cell strings 140a, 140b, 140c, 140d, 140e, and 140f are formed and each of the solar cell strings includes 10 solar cells. However, various modifications are also possible unlike FIGS. 2 to 4.

Meanwhile, the solar cell strings may be electrically connected to one another via bus ribbons. Referring to FIG.

2, electrical connection between the first solar cell strings 140a and the second solar cell strings 140b, between the third solar cell strings 140c and the fourth solar cell strings 140d, and between the fifth solar cell strings 140e and the sixth solar cell strings 140f is achieved by bus ribbons 145a, 145c, and 145e disposed at the lower part of the solar cell module 100, respectively. In addition, as shown in FIG. 2, electrical connection between the second solar cell strings 140b and the third solar cell strings 140c and between the fourth solar cell strings 140d and the fifth solar cell strings 140e is achieved by bus ribbons 145b and 145d disposed at the upper part of the solar cell module 100, respectively.

On the other hand, the ribbon connected to the first solar cell string, the bus ribbons 145b and 145d, and the ribbon connected to the fourth solar cell string are electrically connected to first to fourth conductive lines 135a, 135b, 135c, and 135d, respectively. The first to fourth conductive lines 135a, 135b, 135c, and 135d are connected to bypass diodes Da, Db, and Dc (see FIG. 6) in the junction box 200 disposed at the rear surface of the solar cell module 100. As shown in FIG. 2, the first to fourth conductive lines 135a, 135b, 135c, and 135d extend to the rear surface of the solar cell module 100 through an opening formed at the solar cell module 100.

Meanwhile, the junction box 200 may be disposed more adjacent to one end of the solar cell module 100 to which the conductive lines extend.

As shown in FIGS. 2 and 3, the first to fourth conductive lines 135a, 135b, 135c, and 135d extend from the upper part of the solar cell module 100 to the rear surface of the solar cell module 100. As a result, the junction box 200 is disposed at the upper part of the rear surface of the solar cell module 100. Consequently, it is possible to reduce the length of the conductive lines, thereby reducing power loss.

The rear substrate 110 is a back sheet having waterproof, insulation, and ultraviolet protection functions. For example, the rear substrate 110 may be a Tedlar/PET/Tedlar (TPT) type substrate. However, the embodiment of the invention is not limited thereto. In addition, the rear substrate 110 is formed in a rectangular shape as shown in FIG. 4. However, the rear substrate 110 may be formed in various shapes, such as a circular shape and a semi-circular shape, according to an environment in which the solar cell module 100 is installed.

Meanwhile, the first sealing member 120 may be attached to the rear substrate 110 in a state in which the first sealing member 120 has the same size as the rear substrate 110. The solar cells 130 may be arranged on the first sealing member 120 in a state in which the solar cells 130 are adjacent to one another to form several lines.

The second sealing member 150 may be bonded to the first sealing member 120 by lamination in a state in which the second sealing member 150 is disposed on solar cells 130.

Elements of the solar cells are chemically combined with one another by the first sealing member 120 and the second sealing member 150. For example, the first sealing member 120 and the second sealing member 150 may be made of ethylene vinyl acetate (EVA) film.

On the other hand, the front substrate 160 may be disposed on the second sealing member 150 to transmit solar light. For example, the front substrate 160 may be made of reinforced glass to protect the solar cells 130 from external impact. In another example, the front substrate 160 may be made of low-iron reinforced glass to prevent reflection of solar light and to improve transmittance of the solar light.

The junction box 200 may be attached to the rear surface of the solar cell module 100. The junction box 200 may perform power conversion using DC voltage supplied from the solar cell module 100. Specifically, the junction box 200 may include a power conversion module 700 to convert DC voltage into AC voltage and to output the converted AC voltage.

The power conversion module 700 may include bypass diodes Da, Db, and Dc, a converter unit 530 (see FIG. 6), and an inverter unit 540 (see FIG. 6) disposed on a circuit board. For this reason, the power conversion module 700 may be referred to as a micro inverter.

Meanwhile, the interior of the junction box 200 may be coated with silicone to prevent permeation of moisture into circuit devices in the junction box 200.

The junction box 200 may have an opening, through which the first to fourth conductive lines 135a, 135b, 135c, and 135d are connected to the bypass diodes Da, Db, and Dc (see FIG. 6) in the junction box 200.

An AC output cable 38 to output the converted AC voltage to the outside may be connected to one side of the junction box 200.

The photovoltaic module 50 may include a frame 105 to fix the edge of the solar cell module 100. Meanwhile, the thickness of the junction box 200 may be less than that of the frame 105 such that the junction box 200 does not protrude from the rear surface solar cell module 100.

Figure 5:
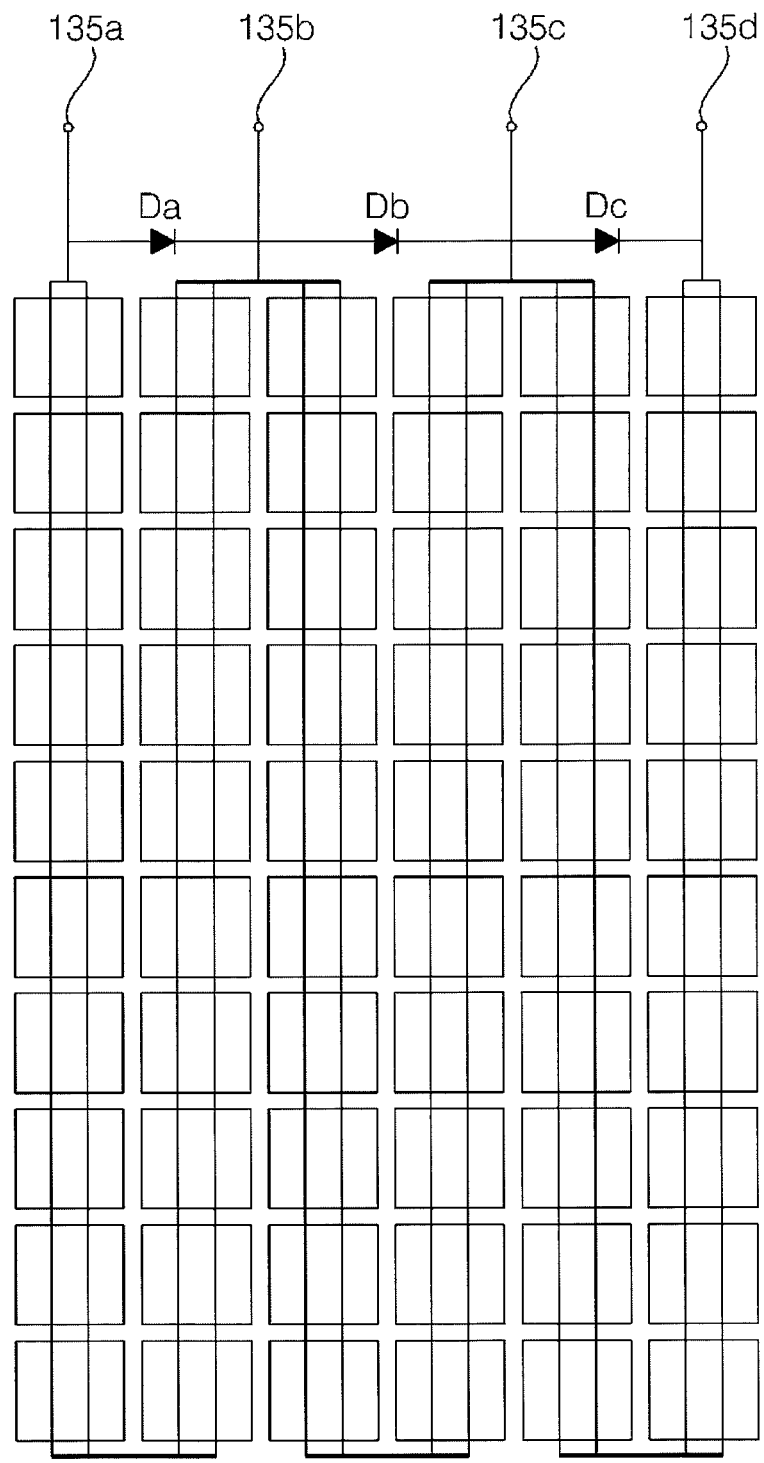
FIG. 5 is a view showing an example of the construction of bypass diodes of the photovoltaic module of FIG. 2.

FIG. 5 is a view showing an example of the construction of bypass diodes of the photovoltaic module of FIG. 2.

Referring to FIG. 5, bypass diodes Da, Db, and Dc may be connected to the six solar cell strings 140a, 140b, 140c, 140d, 140e, and 140f. Specifically, the first bypass diode Da is connected between the first solar cell string 140a and the first bus ribbon 145a to bypass the first solar cell string 140a and the second solar cell string 140b when inverse voltage is generated in the first solar cell string 140a or the second solar cell string 140b.

For example, when voltage of about 0.6 V is generated by a normal solar cell, potential of a cathode of the first bypass diode Da is higher by about 12 V (=0.6 V*20) than that of an anode of the first bypass diode Da. Consequently, the first bypass diode Da performs a normal operation other than a bypassing operation.

When any one solar cell of the first solar cell string 140a is shaded, foreign matter is attached to the corresponding solar cell, or hot spot is generated in the corresponding solar cell, on the other hand, voltage of about 0.6 V is not generated by the corresponding solar cell but inverse voltage (about −15 V) is generated by the corresponding solar cell. As a result, the potential of the anode of the first bypass diode Da is higher by about 15 V than that of the cathode of the first bypass diode Da. Consequently, the first bypass diode Da performs the bypassing operation and, therefore, voltage generated by the solar cells in the first solar cell string 140a and the second solar cell string 140b is not supplied to the junction box 200. When inverse voltage is generated by some solar cells as described above, the bypassing operation is performed to prevent breakdown of the corresponding solar cells. In addition, it is possible to supply DC voltage generated by the solar cells excluding the solar cells having the hot spot regions as described above.

The second bypass diode Db is connected between the first bus ribbon 145a and the second bus ribbon 145b to bypass the third solar cell string 140c and the fourth solar cell string 140d when inverse voltage is generated in the third solar cell string 140c or the fourth solar cell string 140d.

The third bypass diode Dc is connected between the second bus ribbon 145b and the sixth solar cell string 140f to bypass the fifth solar cell string 140e and the sixth solar cell string 140f when inverse voltage is generated in the fifth solar cell string 140e or the sixth solar cell string 140f.

On the other hand, six bypass diodes may be connected to the six solar cell strings unlike FIG. 5. Various other modifications are also possible.

FIG. 6 is a block diagram of an example of the power conversion module in the junction box shown in FIG. 2.

Referring to FIG. 6, the power conversion module 700 in the junction box may include a bypass diode unit 510, a converter unit 530, a capacitor C1, an inverter unit 540, a controller 550, and a communication unit 570.

The bypass diode unit 510 may include bypass diodes Da, Db, and Dc respectively disposed between the first to fourth conductive lines 135a, 135b, 135c, and 135d of the solar cell module 100. The number of the bypass diodes may be at least one but may be less by one than that of the conductive lines.

The bypass diodes Da, Db, and Dc receive photovoltaic DC voltage from the solar cell module 100, particularly from the first to fourth conductive lines 135a, 135b, 135c, and 135d of the solar cell module 100. When voltage received from at least one of the first to fourth conductive lines 135a, 135b, 135c, and 135d is inverse voltage, the bypass diodes Da, Db, and Dc bypass the solar cells corresponding thereto.

Input voltage Vpv passing through the bypass diode unit 510 is input to the converter unit 530.

The converter unit 530 converts the input voltage Vpv output from the converter unit 530. For this reason, the converter unit 530 may be referred to as a first power conversion unit.

Figure 8A:
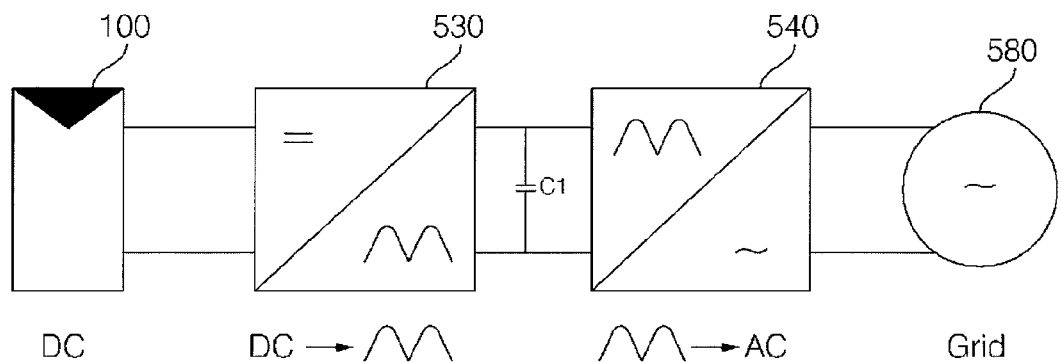
FIGS. 8A and 8B are views illustrating an operation method of the power conversion module of FIG. 6.

For example, as shown in FIG. 8A, the converter unit 530 may convert the input voltage Vpv into pseudo DC voltage. As a result, the pseudo DC voltage may be stored in the capacitor C1. For this reason, opposite ends of the capacitor C1 may be referred to as DC ends and the capacitor C1 may be referred to as a DC end capacitor.

In another example, as shown in FIG. 8A, the converter unit 530 may convert the input voltage Vpv into DC voltage through boosting. As a result, the boosted DC voltage may be stored in the DC end capacitor C1.

The inverter unit 540 may convert the DC voltage stored in the DC end capacitor C1 into AC voltage. For this reason, the inverter unit 540 may be referred to as a second power conversion unit.

For example, the inverter unit 540 may convert the pseudo DC voltage converted by the converter unit 530 into AC voltage.

In another example, the inverter unit 540 may convert the DC voltage boosted by the converter unit 530 into AC voltage.

Meanwhile, the converter unit 530 may include a plurality of interleaving converters for pseudo DC voltage conversion or boosted DC voltage conversion.

Particular, in the embodiment of the invention, the converter unit 530 includes three or more interleaving converters.

As shown in FIG. 6, n converters 610a, 610b, . . . , and 610n are connected in parallel to one another. The n converters 610a, 610b, . . . , and 610n may have the same energy conversion capacity.

A 1/N component of current based on the DC input voltage Vpv is input to each of the n converters 610a, 610b, . . . , and 610n and output current components of the n converters 610a, 610b, . . . , and 610n are combined into one through output ends of the n converters 610a, 610b, . . . , and 610n.

Meanwhile, the n converters 610a, 610b, . . . , and 610n perform an interleaving operation in a state in which a current phase of the n converters 610a, 610b, . . . , and 610n has a phase delay of +(360°/N) or −(360°/N) or a phase delay approximate thereto.

When the n converters 610a, 610b, . . . , and 610n perform the interleaving operation as described above, a ripple of input current and output current of the converter unit 530 may be reduced. As a result, the capacity and size of circuit devices in the power conversion module 700 may be reduced and, therefore, the thickness of the junction box may be less than that of the frame 105 of the solar cell module.

Meanwhile, a tap inductor converter or a flyback converter may be used as each of the interleaving converters.

Meanwhile, the AC voltage converted by the inverter unit 540 is output to an external device through the communication unit 570 in a state in which predetermined information is added to the AC voltage.

That is, the communication unit 570 may output the AC voltage converted by the inverter unit 540 to the grid through power line communication (PLC) in a state in which a carrier frequency signal containing predetermined information is added to the AC voltage.

In this case, the information may include at least one selected from among information regarding power generated by the photovoltaic modules including the solar cell modules, information regarding current input to and output from the photovoltaic modules, information regarding voltage input to and output from the photovoltaic modules, information regarding operation states of the photovoltaic modules, and information regarding errors of the photovoltaic modules. The information may be generated by the controller 550.

When a level of the converted AC voltage is equal to or less than a predetermined level, on the other hand, the communication unit 570 may output predetermined DC voltage to the grid in a state in which a carrier frequency signal containing information is added to the DC voltage.

For example, when the photovoltaic modules do not generate DC voltage and, therefore, there is no converted AC voltage, the communication unit 570 may output additional DC voltage to the grid in a state in which a carrier frequency signal containing information is added to the DC voltage. Alternatively, the communication unit 570 may output DC voltage having a level of 0 to the grid in a state in which a carrier frequency signal containing information is added to the DC voltage. Even when DC voltage is not generated or a level of the AC voltage is equal to or less than a predetermined level, therefore, it is possible to perform communication through the grid.

Meanwhile, the communication unit 570 may not perform two-way communication but may perform one-way communication to transmit information to the grid. As a result, the power conversion module 700 may be simply configured.

The communication device 800 may receive information from the photovoltaic modules 50a, 50b, . . . , and 50n through power line communication (PLC). That is, the communication device 800 may receive information from the photovoltaic modules 50a, 50b, . . . , and 50n through the grid and perform signal processing for the receive information.

The power line communication may be high-speed power line communication (PLC) which is robust to noise. That is, the communication unit 570 in each of the photovoltaic modules 50a, 50b, . . . , and 50n may output information to the grid based on a communication speed of 1 Mbps or higher and a bandwidth of 2 to 30 MHz.

Figure 7A:
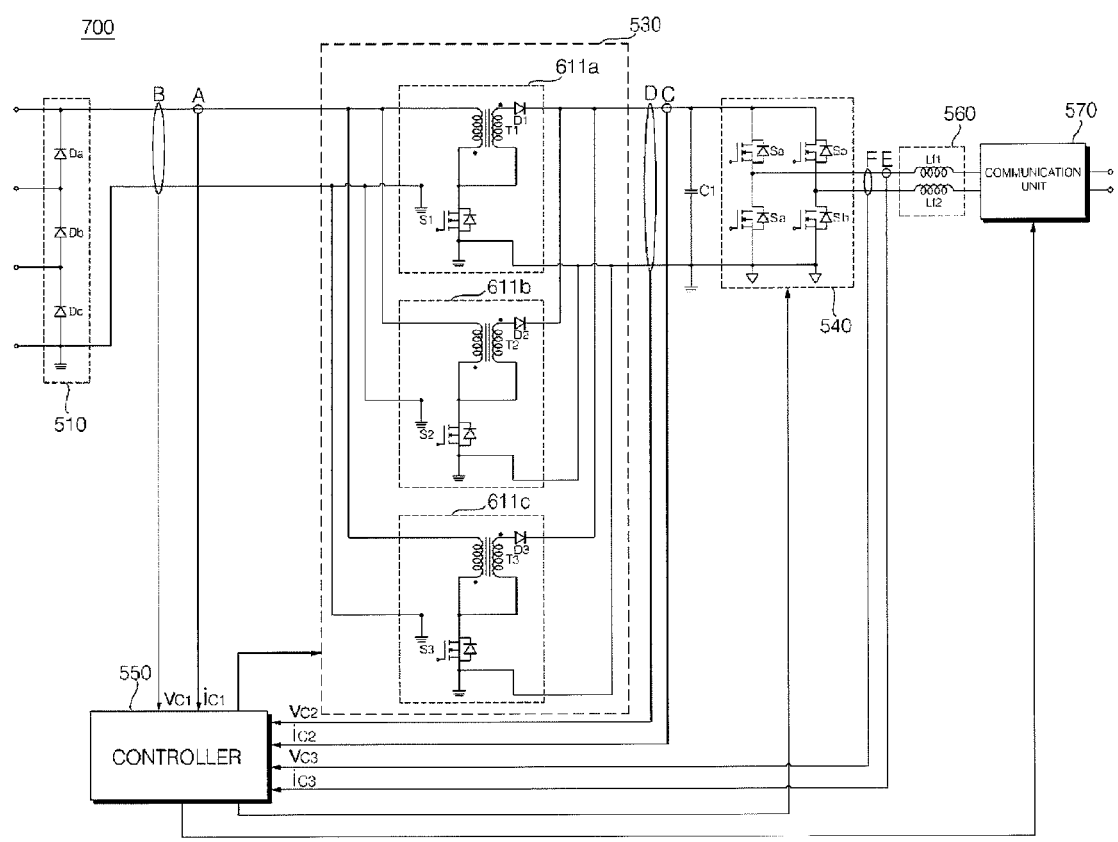
FIG. 7A is an internal circuit diagram of an example of the power conversion module of FIG. 6.

FIG. 7A is an internal circuit diagram of an example of the power conversion module of FIG. 6.

Referring to FIG. 7A, the power conversion module 700 may include a bypass diode unit 510, a converter unit 530, a DC end capacitor C1, an inverter unit 540, a controller 550, a filter unit 560, and a communication unit 570.

FIG. 7A illustrates that tap inductor converters are used as interleaving converters. As shown in FIG. 7A, the converter unit 530 includes first to third tap inductor converters 611a, 611b, and 611c.

The bypass diode unit 510 includes first to third bypass diodes Da, Db, and Dc respectively disposed between node a, node b, node c, and node d corresponding to first to fourth conductive lines 135a, 135b, 135c, and 135d, respectively.

The converter unit 530 may perform power conversion using DC voltage Vpv output from the bypass diode unit 510.

In particular, the first to third tap inductor converters 611a, 611b, and 611c output DC voltage converted through the interleaving operation to the DC end capacitor C1.

The first tap inductor converter 611a includes a tap inductor T1, a switching device S1 connected between the tap inductor T1 and a ground end, and a diode D1 connected to an output end of the tap inductor T1 to perform electric conduction in one direction. In addition, the DC end capacitor C1 is connected between an output end, i.e. a cathode, of the diode D1 and the ground end.

Specifically, the switching device S1 may be connected between a tap of the tap inductor T1 and the ground end. An output end (a secondary side) of the tap inductor T1 is connected to an anode of the diode D1 and the DC end capacitor C1 is connected between the cathode of the diode D1 and the ground end.

The primary side and the secondary side of the tap inductor T1 have opposite polarities. For this reason, the tap inductor T1 may be referred to as a switching transformer.

On the other hand, the primary side and the secondary side of the tap inductor T1 are connected to each other as shown in FIG. 7A. For this reason, the tap inductor converters may be non-insulative converters.

Meanwhile, when the three tap inductor converters 611a, 611b, and 611c are connected in parallel to one another such that the three tap inductor converters 611a, 611b, and 611c are operated in an interleaving mode as shown in FIG. 7A, input current is distributed in parallel. As a result, a ripple of current components output through the respective tap inductor converters 611a, 611b, and 611c is reduced.

The respective tap inductor converters 611a, 611b, and 611c may adaptively operated in response to a required power value of output AC voltage.

For example, when the required power value is about 90 W to 130 W, only the first tap inductor converter 611a may be operated. When the required power value is about 190 W to 230 W, only the first and second tap inductor converters 611a and 611b may be operated. When the required power value is about 290 W to 330 W, all of the first to third tap inductor converters 611a, 611b, and 611c may be operated. That is, the respective tap inductor converters 611a, 611b, and 611c may be selectively operated. The selective operation of the tap inductor converters 611a, 611b, and 611c may be controlled by the controller 550.

The inverter unit 540 converts the DC voltage level-converted by the converter unit 530 into AC voltage. FIG. 7A illustrates a full-bridge inverter. That is, upper arm switching devices Sa and Sb and lower arm switching devices S'a and S'b, which are connected in series in each other, form two pairs. The two pairs of the upper and lower arm switching devices are connected in parallel (Sa & S'a and Sb & S'b) to each other. A diode is connected in inverse parallel to each of the switching devices Sa, S'a, Sb, and S'b.

The switching devices in the inverter unit 540 turn on/off based on an inverter switching control signal from the controller 550. As a result, AC voltage having a predetermined frequency is output. The AC voltage may have the same frequency (about 60 Hz or 50 Hz) as an AC frequency.

The filter unit 560 performs low pass filtering to smooth the AC voltage output from the inverter unit 540. To this end, as shown in FIG. 7A, inductors Lf1 and Lf2 are provided. However, various other examples may be provided.

Meanwhile, the communication unit 570, which communicates with the grid through power line communication, may be disposed after the filter unit 560.

The communication unit 570 may add predetermined information to the noise-reduced AC voltage using a carrier frequency signal having a predetermined frequency. That is, the communication unit 570 may perform power line communication. In addition, the communication unit 570 may output the AC voltage having the information added thereto to the grid.

Meanwhile, a converter input current detection unit A detects current ic1 input to the converter unit 530 and a converter input voltage detection unit B detects voltage vc1 input to the converter unit 530. The detected input current ic1 and input voltage vc1 may be input to the controller 550.

A converter output current detection unit C detects current ic2 output from the converter unit 530 and a converter output voltage detection unit D detects voltage vc2, i.e. DC end voltage, output from the converter unit 530. The detected output current ic2 and output voltage vc2 may be input to the controller 550.

An inverter output current detection unit E detects current ic3 output from the inverter unit 540 and an inverter output voltage detection unit E detects voltage vc3 output from the inverter unit 540. The detected output current ic3 and output voltage vc3 may be input to the controller 550.

Meanwhile, the controller 550 may output a control signal to control the switching device S1 of the converter unit 530 shown in FIG. 7. In particular, the controller 550 may output a turn-on timing signal of the switching device S1 in the converter unit 530 based on at least one selected from among the detected input current ic1, input voltage vc1, output current ic2, output voltage vc2, output current ic3, and output voltage vc3.

On the other hand, the controller 550 may output an inverter control signal to control the respective switching devices Sa, S'a, Sb, and S'b of the inverter unit 540. In particular, the controller 550 may output a turn-on timing signal of the respective switching devices Sa, S'a, Sb, and S'b of the inverter unit 540 based on at least one selected from among the detected input current ic1, input voltage vc1, output current ic2, output voltage vc2, output current ic3, and output voltage vc3.

In addition, the controller 550 may calculate the maximum power point of the solar cell module 100 and control the converter unit 530 to output DC voltage corresponding to the maximum power.

Meanwhile, the controller 550 may generate at least one selected from among information regarding power generated by the photovoltaic modules, information regarding current input to and output from the photovoltaic modules, information regarding voltage input to and output from the photovoltaic modules, information regarding operation states of the photovoltaic modules, and information regarding errors of the photovoltaic modules.

The communication unit 570 may output AC voltage converted by the inverter unit 540 to the grid through power line communication (PLC) in a state in which a carrier frequency signal containing information generated by the controller 550 is added to the AC voltage.

When a level of the converted AC voltage is equal to or less than a predetermined level, on the other hand, the communication unit 570 may output predetermined DC voltage to the grid in a state in which a carrier frequency signal containing information is added to the DC voltage.

Figure 7B:
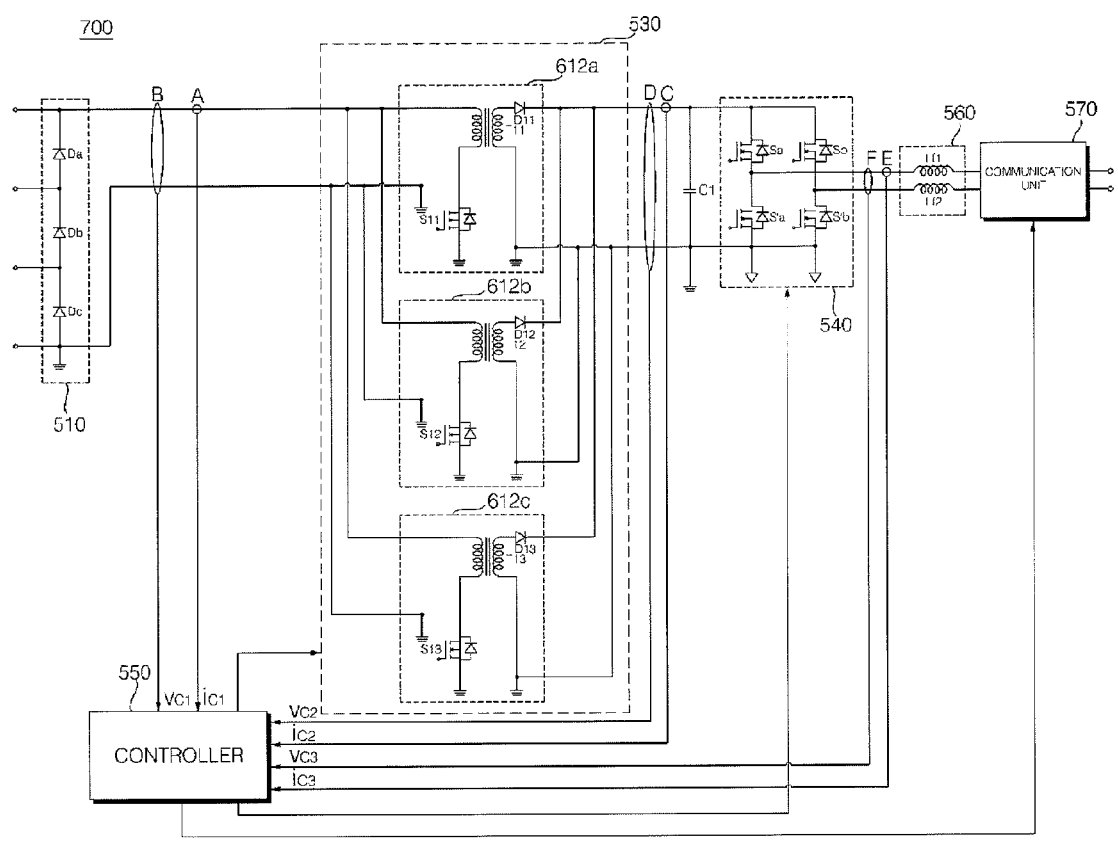
FIG. 7B is an internal circuit diagram of another example of the power conversion module of FIG. 6.

FIG. 7B is an internal circuit diagram of another example of the power conversion module of FIG. 6.

In the same manner as in the power conversion module 700 of FIG. 7A, the power conversion module 700 of FIG. 7B may include a bypass diode unit 510, a converter unit 530, a DC end capacitor C1, an inverter unit 540, a controller 550, a filter unit 560, and a communication unit 570.

However, FIG. 7B illustrates that flyback converters are used as interleaving converters of the converter unit 530. As shown in FIG. 7B, the converter unit 530 includes first to third flyback converters 612a, 612b, and 612c.

In particular, the first to third flyback converters 612a, 612b, and 612c are insulative converters unlike the non-insulative tap inductor converters. The first to third flyback converters 612a, 612b, and 612c output DC voltage converted through the interleaving operation to the DC end capacitor C1.

The first flyback converter 612a includes a transformer T11, a switching device S11 connected between a primary side of the transformer T11 and a ground end, and a diode D11 connected to a secondary side of the transformer T11 to perform electric conduction in one direction. In addition, the DC end capacitor C1 is connected between an output end, i.e. a cathode, of the diode D11 and the ground end. Meanwhile, the primary side and the secondary side of the transformer T11 have opposite polarities.

Meanwhile, the controller 550 may generate at least one selected from among information regarding power generated by the photovoltaic modules, information regarding current input to and output from the photovoltaic modules, information regarding voltage input to and output from the photovoltaic modules, information regarding operation states of the photovoltaic modules, and information regarding errors of the photovoltaic modules.

The communication unit 570 may output AC voltage converted by the inverter unit 540 to the grid through power line communication (PLC) in a state in which a carrier frequency signal containing information generated by the controller 550 is added to the AC voltage.

When a level of the converted AC voltage is equal to or less than a predetermined level, on the other hand, the communication unit 570 may output predetermined DC voltage to the grid in a state in which a carrier frequency signal containing information is added to the DC voltage.

Figure 8B:
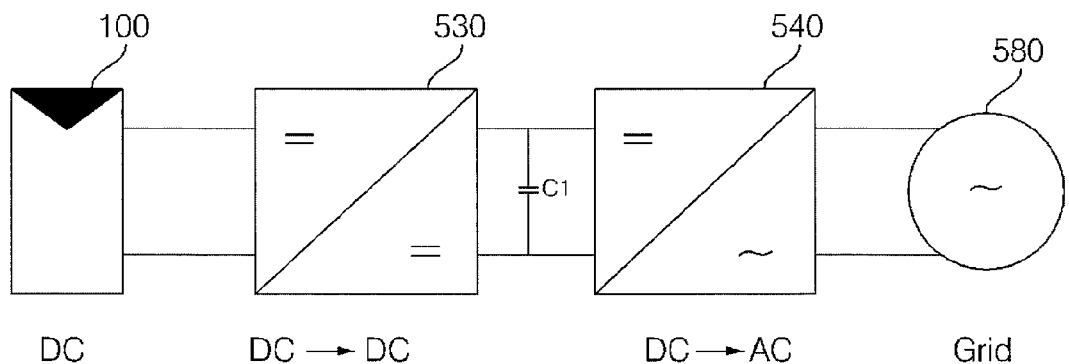

FIGS. 8A and 8B are views illustrating an operation method of the power conversion module of FIG. 6.

Referring first to FIG. 8A, the converter unit 530 of the power conversion module 700 according to the embodiment of the invention may convert DC voltage from the solar cell module 100 into pseudo DC voltage.

When the converter unit 530 is a tap inductor converter as shown in FIG. 7A or a flyback converter as shown in FIG. 7B, the converter unit 530 may convert DC voltage into pseudo DC voltage having an envelope, such as full-wave rectified DC voltage, according to switching on/off of the switching device (S1 or S11). The capacitor C1 may store the pseudo DC voltage.

Meanwhile, the inverter 540 receives the pseudo DC voltage, performs a switching operation for the received pseudo DC voltage, and outputs AC voltage. Specifically, the inverter 540 may convert the pseudo DC voltage having the envelope, such as the full-wave rectified DC voltage, into AC voltage having positive (+) and negative (−) polarities and output the AC voltage. In particular, the inverter 540 may convert the pseudo DC voltage into AC voltage corresponding to a grid frequency and output the AC voltage.

Next, referring to FIG. 8B, the converter unit 530 of the power conversion module 700 according to the embodiment of the invention may convert DC voltage from the solar cell module 100 into boosted DC voltage through level-conversion, specifically boosting.

When the converter unit 530 is a tap inductor converter as shown in FIG. 7A or a flyback converter as shown in FIG. 7B, the converter unit 530 may convert DC voltage Vp into boosted DC voltage according to switching on/off of the switching device (S1 or S11). The capacitor C1 may store the boosted DC voltage.

The inverter 540 receives the boosted DC voltage, performs a switching operation for the received boosted DC voltage, and outputs AC voltage. In particular, the inverter 540 may convert the boosted DC voltage into AC voltage corresponding to a grid frequency and output the AC voltage.

Figure 9A:
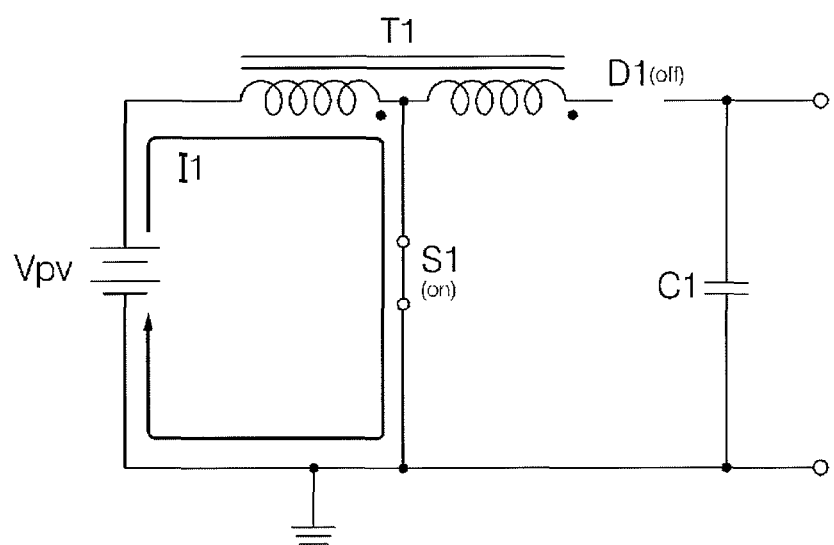
FIGS. 9A and 9B are reference views illustrating operation of a tap inductor converter shown in FIG. 7A.
Figure 9B:
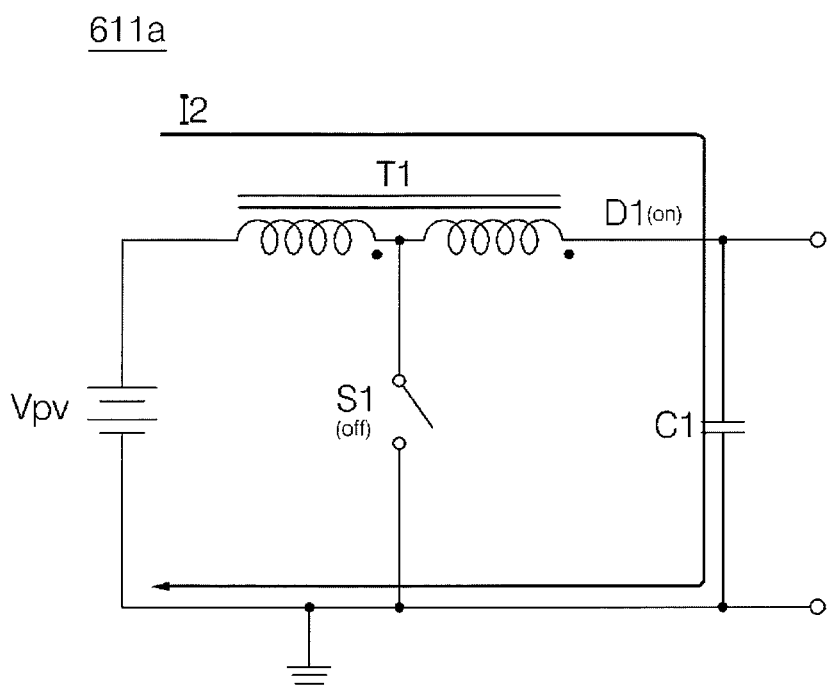

FIGS. 9A and 9B are reference views illustrating operation of the tap inductor converter shown in FIG. 7A.

The operation of the first tap inductor converter 611a will be described briefly. When the switching device S1 is turned on, a closed loop is formed by input voltage Vpv, the primary side of the tap inductor T1, and the switching device S1 as shown in FIG. 9A. And first current I1 flows in the closed loop. At this time, the diode D1 is not electrically conducted and turned off since the secondary side of the tap inductor T1 has a polarity opposite to that of the primary side of the tap inductor T1. As a result, the input voltage Vpv is stored in the primary side of the tap inductor T1.

When the switching device S1 is turned off, on the other hand, a closed loop is formed by the input voltage Vpv, the primary side and the secondary side of the tap inductor T1, the diode D1, and the capacitor C1 as shown in FIG. 9B. And second current I2 flows in the closed loop. At this time, the diode D1 is electrically conducted since the secondary side of the tap inductor T1 has a polarity opposite to that of the primary side of the tap inductor T1. As a result, the input voltage Vpv and energy stored in the primary side and the secondary side of the tap inductor T1 may be stored in the capacitor C1 via the diode D1.

As described above, the converter unit 530 may output pseudo DC voltage or high-efficiency, high-power DC voltage using the input voltage Vpv and the energy stored in the primary side and the secondary side of the tap inductor T1.

Figure 10A:
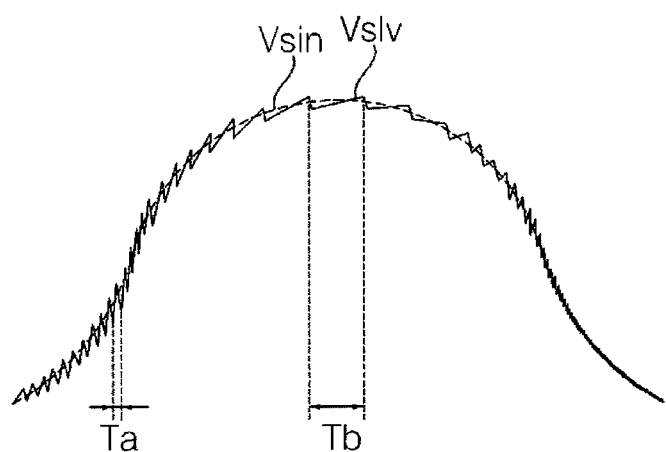
FIGS. 10A and 10B are reference views illustrating that a converter unit shown in FIG. 6 outputs pseudo direct current (DC) voltage using input voltage.
Figure 10B:
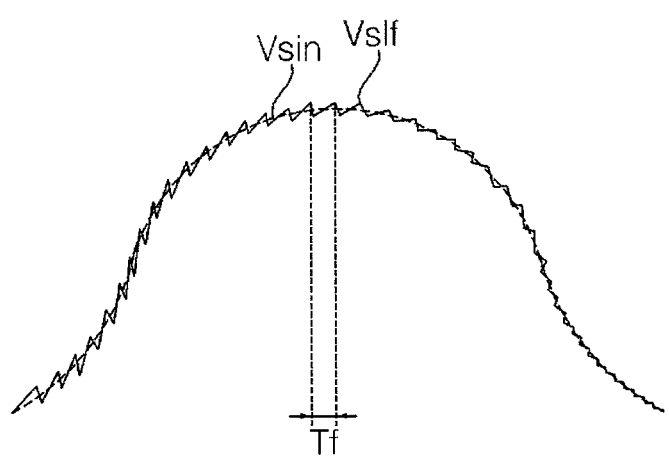

FIGS. 10A and 10B are reference views illustrating that the converter unit shown in FIG. 6 outputs pseudo DC voltage using input voltage.

Referring to FIGS. 6 and 10A, first to third interleaving converters 610a, 610b, and 610c in the converter unit 530 output pseudo DC voltage using input DC voltage Vpv.

Specifically, the converter unit 530 outputs pseudo DC voltage having a peak value of about 330 V using DC voltage of about 32 V to 36 V from the solar cell module 100.

To this end, the controller 550 decides a switching device duty of the first to third interleaving converters 610a, 610b, and 610c based on the detected input voltage Vpv and target output voltage Vdc.

In particular, as the input voltage Vpv is decreased, the switching device duty of the first to third interleaving converters 610a, 610b, and 610c is increased. In addition, as the input voltage Vpv is increased, the switching device duty of the first to third interleaving converters 610a, 610b, and 610c is decreased.

On the other hand, as the target output voltage Vdc is decreased, the switching device duty of the first to third interleaving converters 610a, 610b, and 610c is decreased. In addition, as the target output voltage Vdc is increased, the switching device duty of the first to third interleaving converters 610a, 610b, and 610c is increased. For example, when the target output voltage Vdc has a peak value of about 330 V, the switching device duty of the first to third interleaving converters 610a, 610b, and 610c may be the highest.

FIG. 10A illustrates a pseudo DC voltage waveform Vslv output according to change of the duty as described above. As shown in FIG. 10A, the pseudo DC voltage waveform Vslv follows a target sine waveform Vsin.

Meanwhile, in the embodiment of the invention, the switching frequency of the converter unit 530 is changed such that the pseudo DC voltage waveform Vslv more accurately follows the full-wave rectified waveform Vsin.

An error ΔE2 between a pseudo DC voltage waveform Vslf and a target sine waveform Vsin when the switching frequency of the converter unit 530 is fixed as shown in FIG. 10B is greater than an error ΔE1 between the pseudo DC voltage waveform Vslv and the target sine waveform Vsin when the switching frequency of the converter unit 530 is changed as shown in FIG. 10A.

In the embodiment of the invention, the switching frequency of the converter unit 530 is changed in order to reduce such an error. That is, the switching frequencies of the switching devices of the first to third interleaving converters 610a, 610b, and 610c are changed.

The controller 550 may control the switching frequency of the converter unit 530 to be increased, i.e. the switching period of the converter unit 530 to be decreased, as a change rate of the target sine waveform Vsin is increased. On the other hand, the controller 550 may control the switching frequency of the converter unit 530 to be decreased, i.e. the switching period of the converter unit 530 to be increased, as the change rate of the target sine waveform Vsin is decreased.

FIG. 10A illustrates that the switching period of the converter unit 530 is set to Ta in a rising period of the target sine waveform Vsin and the switching period of the converter unit 530 is set to Tb, which is greater than Ta, in a peak period of the target sine waveform Vsin. That is, FIG. 10A illustrates that the switching frequency corresponding to the switching period Ta is higher than the switching frequency corresponding to the switching period Tb. As a result, it is possible to reduce the error ΔE1 between the pseudo DC voltage waveform Vslv and the target sine waveform Vsin.

Meanwhile, change of the switching frequency in FIG. 10A may be described based on a switching mode of the switching device, which will hereinafter be described with reference to FIGS. 11 and 12.

Figure 11:
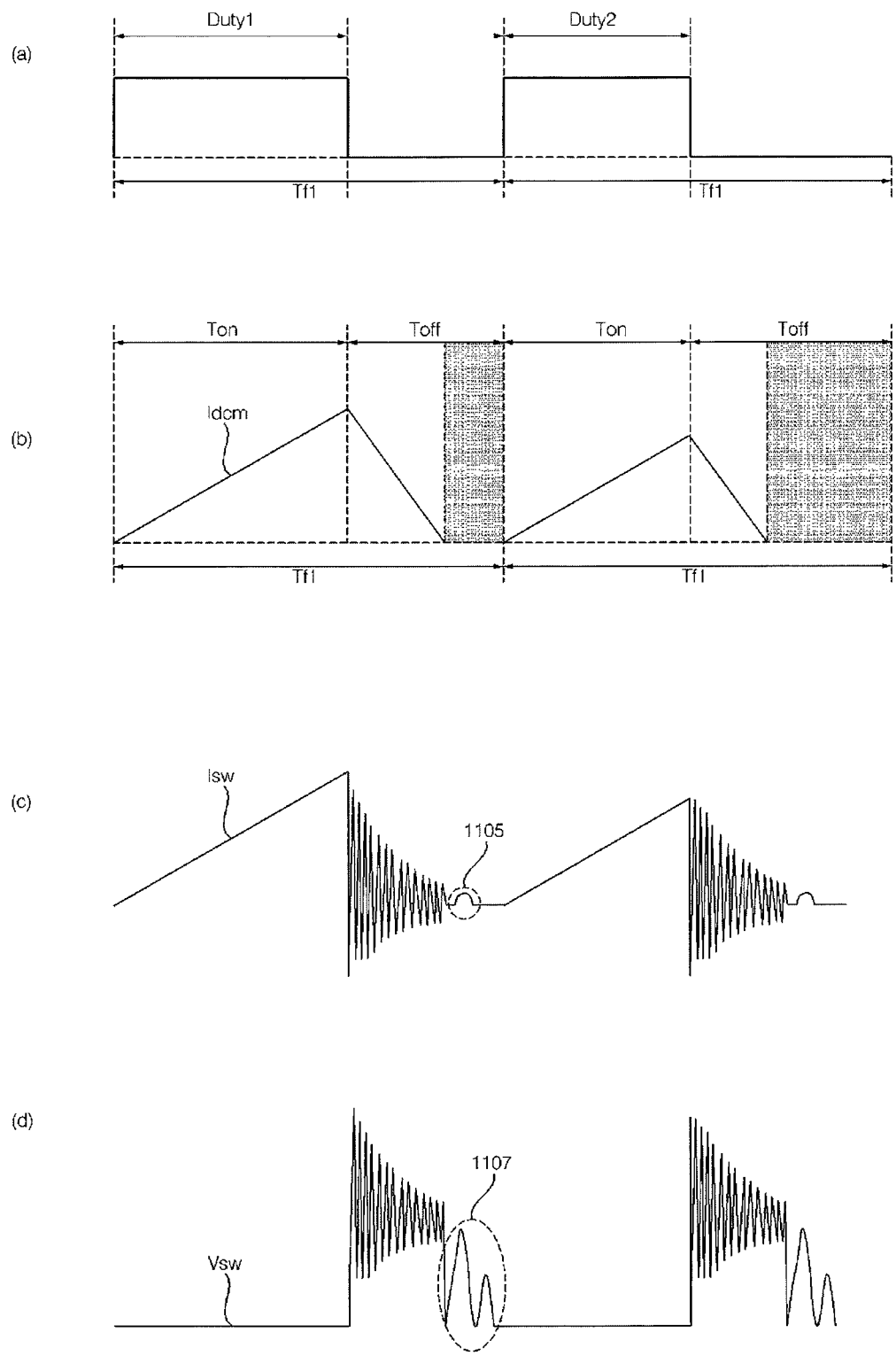
FIGS. 11 and 12 are reference views illustrating change of a switching frequency according to a switching mode of a switching device.
Figure 12:
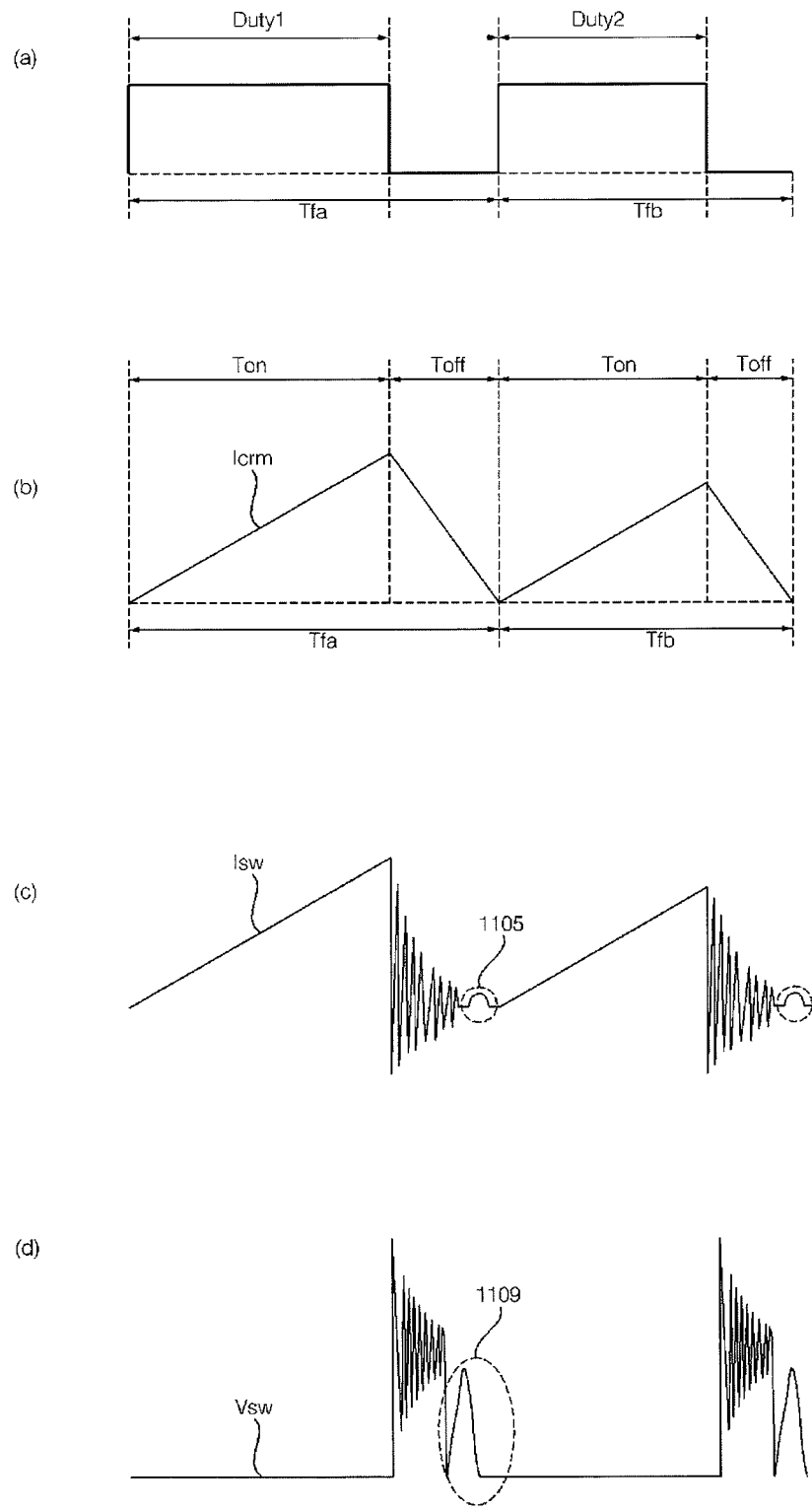

FIGS. 11 and 12 are reference views illustrating change of the switching frequency according to the switching mode of the switching device.

First, FIG. 11(a) illustrates an example of a duty waveform of the switching device of the interleaving converter. Referring to FIG. 11(a), the switching device is turned on during a first duty duty1 of a first switching period Tf1 and then turned off. In addition, the switching device is turned on during a second duty duty2 of a second switching period Tf2 and then turned off. As shown in FIG. 11(a), the first duty duty1 is greater than the second duty duty2.

On the other hand, FIG. 11(a) illustrates that the switching period of the interleaving converter is fixed and a discontinuous conduction mode (DCM) is applied as the switching mode.

FIG. 11(b) illustrates a waveform Idcm of current flowing in the switching device when the switching period of the interleaving converter is fixed and the DCM mode is applied as the switching mode. As the switching device is turned on, the current flowing in the switching device is increased. As the switching device is turned off, the current flowing in the switching device is decreased.

FIG. 11(c) illustrates a waveform of real current flowing in the switching device of the interleaving converter in the DCM mode and FIG. 11(d) illustrates switching voltage at both ends of the switching device of the interleaving converter in the DCM mode.

On the other hand, a resonance period 1105 may be generated in the interleaving converter after the switching device is turned off and before the next switching period is commenced. At this time, a period 1107 in which the switching voltage at both ends of the switching device is not 0 is generated when the switching device is operated in the DCM mode. Consequently, zero voltage switching (ZVS) for the switching device is not performed with the result that efficiency of the interleaving converter is decreased.

In the embodiment of the invention, a critical conduction mode (CRM) is used as the switching mode instead of DCM in order to solve the above problem. The CRM mode may be referred to as a boundary conduction mode (BCM) or a transition mode (TM).

The CRM mode means a mode in which the switching period is commenced whenever current flowing in the switching device of the interleaving converter is 0 after the switching device is turned off. In the CRM mode, therefore, the switching period may be changed according to the duty of the switching period.

FIG. 12(a) illustrates an example of a duty waveform of the switching device of the interleaving converter. Referring to FIG. 12(a), the switching device is turned on during a first duty duty1 of a first switching period Tfa and then turned off. In addition, the switching device is turned on during a second duty duty2 of a second switching period Tfb and then turned off. As shown in FIG. 12(a), the first duty duty1 is greater than the second duty duty2.

On the other hand, FIG. 12(a) illustrates that the switching period of the interleaving converter is changed according to change of the duty and, therefore, the CRM mode, in which the switching frequency is changed, is applied as the switching mode.

FIG. 12(b) illustrates a waveform Icrm of current flowing in the switching device when the CRM mode, in which the switching frequency is changed, is applied as the switching mode. As the switching device is turned on, the current flowing in the switching device is increased. As the switching device is turned off, the current flowing in the switching device is decreased.

FIG. 12(c) illustrates a waveform of real current flowing in the switching device of the interleaving converter in the CRM mode and FIG. 12(d) illustrates switching voltage at both ends of the switching device of the interleaving converter in the CRM mode.

On the other hand, a resonance period 1105 may be generated in the interleaving converter after the switching device is turned off. At this time, a time when the current flowing in the switching device is 0 may be decided and the switching device may be turned on at the time when the current flowing in the switching device is 0, i.e. at the time of zero crossing, although the resonance period 1105 is generated in the interleaving converter when the switching device is operated in the CRM mode. Consequently, zero voltage switching (ZVS) for the switching device is performed with the result that efficiency of the interleaving converter is increased.

In the embodiment of the invention, therefore, the switching frequency of the switching device of the interleaving converter is changed in the CRM mode.

When three interleaving converters 610a, 610b, and 610c are used as shown in FIG. 6, on the other hand, the first to third interleaving converters 610a, 610b, and 610c may be operated while having phase differences between the first to third interleaving converters 610a, 610b, and 610c.

At this time, when predetermined phase differences, e.g. phase differences of 120 degrees, are set between the operation sections of the first to third interleaving converters 610a, 610b, and 610c in a state in which change of the switching frequencies is applied, output power may be lowered if the switching periods are lengthened, which will hereinafter be described with reference to FIGS. 14 and 15.

Figure 13:
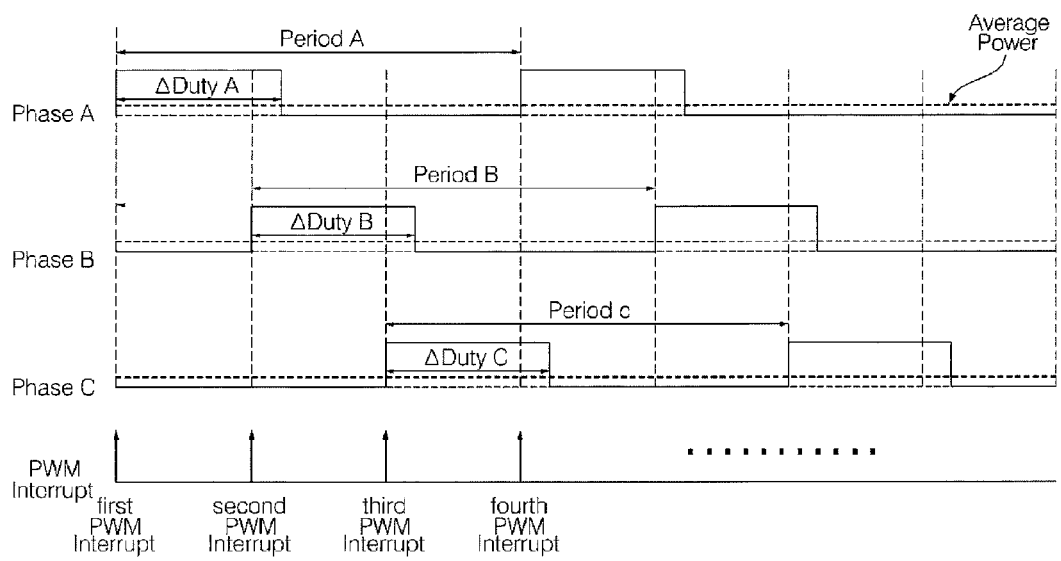
FIG. 13 is a view showing a case in which switching frequencies of three interleaving converters are fixed.

FIG. 13 illustrates a case in which the switching frequencies of the three interleaving converters 610a, 610b, and 610c are fixed.

Referring to FIG. 13, the switching periods of the three interleaving converters 610a, 610b, and 610c are Period A, Period B, and Period C, which are the same, and the differences between the operation sections of the three interleaving converters 610a, 610b, and 610c, i.e. the phase differences between the three interleaving converters 610a, 610b, and 610c, are the same.

In addition, the operation sections of the three interleaving converters 610a, 610b, and 610c are portions (ΔDuty A, ΔDuty B, and ΔDuty C) in the respective switching periods. The operation sections of the three interleaving converters 610a, 610b, and 610c may be commenced according to a PWM interrupt signal.

When the duties in the operation sections of the three interleaving converters 610a, 610b, and 610c are the same, the average powers of the three interleaving converters 610a, 610b, and 610c are the same as shown in FIG. 13.

That is, when the switching frequencies of the three interleaving converters 610a, 610b, and 610c are fixed and the phase differences between the three interleaving converters 610a, 610b, and 610c are fixed, the average powers of the three interleaving converters 610a, 610b, and 610c may be almost the same.

When the switching frequencies of the three interleaving converters 610a, 610b, and 610c are changed and the phase differences between the three interleaving converters 610a, 610b, and 610c are fixed, on the other hand, output power may be instantaneously lowered, which will hereinafter be described with reference to FIG. 14.

Figure 14:
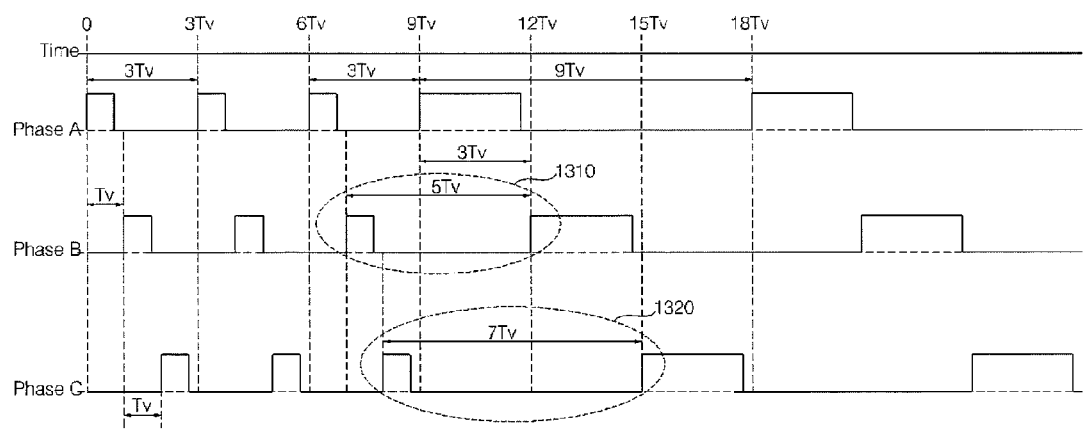
FIG. 14 is a view showing a case in which the switching frequencies of three interleaving converters are changed and phase differences between the three interleaving converters are fixed.

FIG. 14 illustrates a case in which the switching frequencies of the three interleaving converters 610a, 610b, and 610c are changed and the phase differences between the three interleaving converters 610a, 610b, and 610c, are fixed.

Referring to FIG. 14, the switching periods of the three interleaving converters 610a, 610b, and 610c are fixed (3Tv) time 0 to time 9Tv and the phase differences between the three interleaving converters 610a, 610b, and 610c, i.e. the differences between phases (phase a, phase b, and phase c) of the three interleaving converters 610a, 610b, and 610c, are Tv.

The switching periods of the three interleaving converters 610a, 610b, and 610c are changed at the next time 9Tv with the result that the switching periods of the three interleaving converters 610a, 610b, and 610c are increased by three times (9Tv). In this case, the first interleaving converter is operated during the time section of 3Tv after the time section of 3Tv. The second interleaving converter is operated during the time section of 3Tv after the time section of 5Tv in consideration of the changed duty (3Tv) of the first interleaving converter. The third interleaving converter is operated during the time section of 3Tv after the time section of 7Tv in consideration of the changed duty (3Tv) of the second interleaving converter.

At this time, the phase differences between the first to third interleaving converters 610a, 610b, and 610c are fixed to 120 degrees although the switching periods of the three interleaving converters 610a, 610b, and 610c are changed. That is, the first interleaving converter is operated and then the second interleaving converter is operated after the time section of 3Tv. In addition, the first interleaving converter is operated and then the third interleaving converter is operated after the time section of 6Tv.

In the switching period change sections 1310 and 1320, power output from the second interleaving converter and the third interleaving converter is lower than that power output from the first interleaving converter. As a result, output current or output voltage from the converter unit 530 is instantaneously lowered.

In order to solve the above problem, in the embodiment of the invention, phases for the operation section of the interleaving converters are changed to avoid output unbalance between the interleaving converters during change of the switching periods of the interleaving converters, which will hereinafter be described with reference to FIG. 15.

Figure 15:
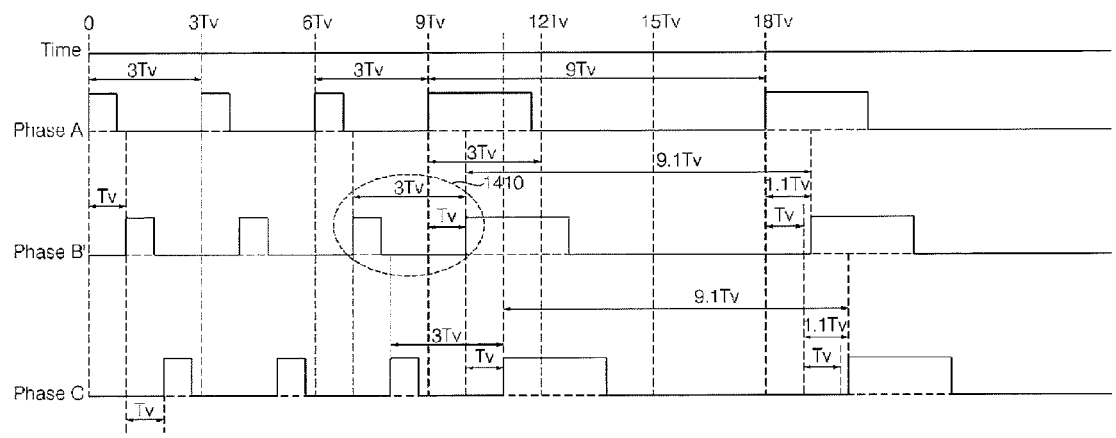
FIG. 15 is a view showing a case in which the switching frequencies of the three interleaving converters and the phase differences between the three interleaving converters are changed.

FIG. 15 is a view showing a case in which the switching frequencies of the three interleaving converters 610a, 610b, and 610c and the phase differences between the three interleaving converters 610a, 610b, and 610c are changed.

Referring to FIG. 15, the switching periods of the three interleaving converters 610a, 610b, and 610c are fixed (3Tv) from time 0 to time 9Tv and the phase differences between the three interleaving converters 610a, 610b, and 610c, i.e. the differences between phases (phase a, phase b, and phase c) of the three interleaving converters 610a, 610b, and 610c, are Tv.

The switching periods of the three interleaving converters 610a, 610b, and 610c are changed at the next time 9Tv with the result that the switching periods of the three interleaving converters 610a, 610b, and 610c are increased by three times (9Tv). In this case, the first interleaving converter is operated during the time section of 3Tv after the time section of 3Tv. In a switching period change section 1410, the second interleaving converter is operated during the time section of 3Tv after the time section of 3Tv from the switching period change time 9Tv and the third interleaving converter is operated during the time section of 3Tv after the time section of 6Tv from the switching period change time 9Tv.

That is, unlike FIG. 14, the controller 550 changes the phase differences between the first to third interleaving converters 610a, 610b, and 610c in response to the changed periods of the three interleaving converters 610a, 610b, and 610c. As shown in FIG. 15, the phase difference between the first and second interleaving converters 610a and 610b and the phase differences between the second and third interleaving converters 610a and 610c are changed from 120 degrees to 40 degrees.

When the switching periods of the three interleaving converters 610a, 610b, and 610c are increased, the controller 550 may vary the phases of the first to third interleaving converters 610a, 610b, and 610c such that the phase differences between the first to third interleaving converters 610a, 610b, and 610c are decreased. In the similar manner, when the switching periods of the three interleaving converters 610a, 610b, and 610c are decreased, the controller 550 may vary the phases of the first to third interleaving converters 610a, 610b, and 610c such that the phase differences between the first to third interleaving converters 610a, 610b, and 610c are increased, for example from 120 degrees to 130 degrees.

On the other hand, when the switching periods of the three interleaving converters 610a, 610b, and 610c are increased, the controller 550 may vary the phases of the first to third interleaving converters 610a, 610b, and 610c such that an overlapping region is present between the operation sections of the interleaving converters, particularly the overlapping region between the operation sections of the interleaving converters is increased. FIG. 15 illustrates that the operation sections of the first interleaving converter and the second interleaving converter overlap during the time section of about 2Tv.

After the switching periods of the three interleaving converters 610a, 610b, and 610c are changed, at time 18Tv, the first interleaving converter may be operated during the time section of 3Tv after the time section of 9Tv, the second interleaving converter may be operated during the time section of 3Tv after the time section of 9.1Tv, and third interleaving converter may be operated during the time section of 3Tv after the time section of 9.1Tv.

After the changed switching periods of the three interleaving converters 610a, 610b, and 610c, the controller may vary the phase differences between the first to third interleaving converters 610a, 610b, and 610c such that the phase differences between the first to third interleaving converters 610a, 610b, and 610c are approximate to a reference phase difference. As shown in FIG. 15, the phase difference between the first and second interleaving converters 610a and 610b and the phase differences between the second and third interleaving converters 610a and 610c after time 18Tv are increased from 40 degrees to about 41 degrees.

When the phase differences between the first to third interleaving converters 610a, 610b, and 610c are sequentially controlled to be approximate to the reference phase difference, i.e. 120 degrees, as described above, it is possible to prevent current distortion and, in addition, to prevent reduction of power output from the second interleaving converter and the third interleaving converter.

Meanwhile, the phase change as described above may be applied to a case in which at least two interleaving converters are used. For example, even when only two interleaving converters are used, the phases of the interleaving converters may be changed.

The switching frequency change and the phase change described with reference to FIGS. 10A to 15 may be applied to the converter unit 530. In particular, the switching frequency change and the phase change may be applied to the converter unit 530 when the converter unit 530 is a tap inductor converter as shown in FIG. 7A or a flyback converter as shown in FIG. 7B.

FIG. 16 is an internal block diagram of an example of the communication device shown in FIG. 1.

Referring to FIG. 16, the communication device 800 may receive information of the photovoltaic modules 50a, 50b, . . . , and 50n from the grid through high-speed power line communication. The communication device 800 may be referred to as a gateway.

To this end, the communication device 800 may include a first communication unit 810, a controller 820, a second communication unit 830, an output unit 840, and a power supply unit 850.

The first communication unit 810 may receive information from the photovoltaic modules 50a, 50b, . . . , and 50n through power line communication and transmit the received information to the controller 820.

The power line communication may be high-speed power line communication (PLC) which is robust to noise. That is, the first communication unit 810 may receive information of the photovoltaic modules 50a, 50b, . . . , and 50n from the grid based on a communication speed of 1 Mbps or higher and a bandwidth of 2 to 30 MHz.

In addition, the first communication unit 810 may separate a carrier frequency signal from the received AC voltage and extract information from the carrier frequency signal. The extracted information may be transmitted to the controller 820.

The controller 820 may control the received information to be signal-processed and may control the signal-processed information to be displayed as an image or to be output as a sound through the output unit 840. As a result, it is possible to easily and conveniently check the information of the photovoltaic modules.

On the other hand, the controller 820 may control the received information to be transmitted to an external device through the second communication unit 830. For example, the controller 820 may control the received information to be transmitted to the mobile terminal 600 in a wireless fashion or may control the received information to be transmitted to the server 300 or the mobile terminal 600 over the network 750 in a wireless fashion.

Meanwhile, the power supply unit 850 may receive additional voltage from an external device. Even when no AC voltage is applied to the grid, therefore, the communication device 800 may be operated unlike a conventional communication device that is operated based on AC voltage applied to the grid In addition, even when no AC voltage is applied to the grid, it is possible to receive information from the photovoltaic modules 50a, 50b, . . . , and 50n. Even when no AC voltage is applied to the grid and no AC voltage is output from the photovoltaic modules 50a, 50b, . . . , and 50n, on the other hand, it is possible to receive information based on DC voltage. Consequently, it is possible to stably receive information.

The second communication unit 830 may access the server 300 or the mobile terminal 600 through the network. Alternatively, the second communication unit 830 may directly access the server 300 or the mobile terminal 600. The second communication unit 830 may transmit information regarding photovoltaic power for a building in which the photovoltaic modules 50*a*, 50*b*, . . . , and 50*n* are installed or information regarding photovoltaic power corresponding to each module to the server 300 or the mobile terminal 600. Consequently, it is possible to easily and conveniently check information regarding photovoltaic power generated per building or per module.

Figure 17A:
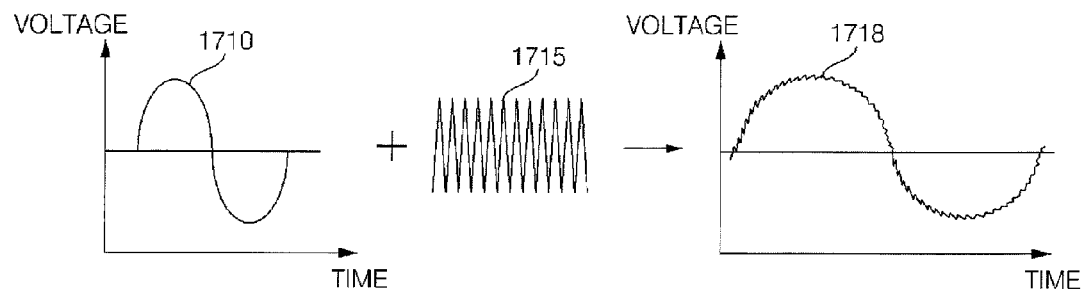
FIGS. 17A to 17C are views illustrating various examples of a communication method between a photovoltaic module and the communication device shown in FIG. 1.
Figure 17B:
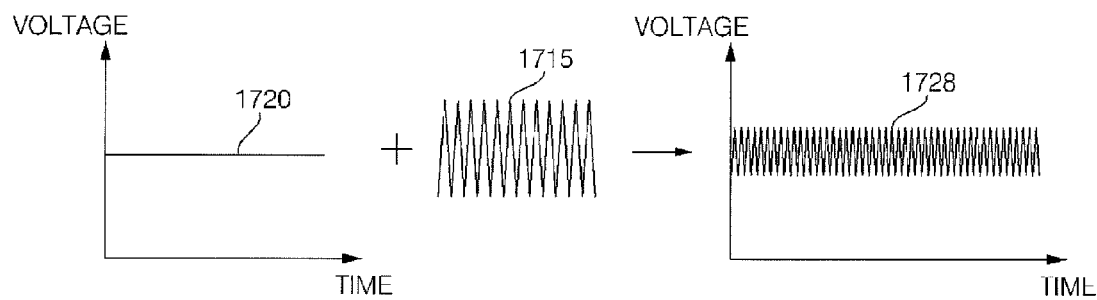
Figure 17C:
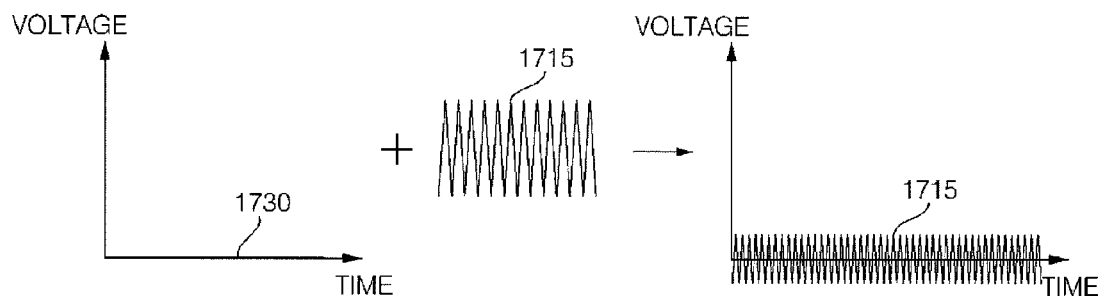

FIGS. 17A to 17C are views illustrating various examples of a communication method between the photovoltaic module and the communication device shown in FIG. 1.

First, FIG. 17A illustrates an example of the power line communication method when AC voltage is output from the power conversion apparatus 700.

The communication unit 570 in the power conversion apparatus 700 adds a carrier frequency signal 1715 containing predetermined information to AC voltage 1710 output from the inverter unit 540. As a result, AC voltage 1718 having the carrier frequency signal added thereto is output to the grid. The communication device 800 may receive the AC voltage to extract the information from the received AC voltage.

Next, FIG. 17B illustrates another example of the power line communication method when AC voltage is output from the power conversion apparatus 700.

When there is no AC voltage output from the inverter unit 540, the communication unit 570 in the power conversion apparatus 700 adds a carrier frequency signal 1715 containing predetermined information to DC voltage 1720 having a first level. As a result, AC voltage 1728 having the carrier frequency signal added thereto is output to the grid. The communication device 800 may receive the AC voltage 1728 to extract the information from the received AC voltage 1728.

Next, FIG. 17C illustrates a further example of the power line communication method when AC voltage is output from the power conversion apparatus 700.

When there is no AC voltage output from the inverter unit 540, the communication unit 570 in the power conversion apparatus 700 adds a carrier frequency signal 1715 containing predetermined information to DC voltage 1730 having a level of 0. As a result, only the carrier frequency signal 1715 containing the predetermined information is output to the grid. The communication device 800 may receive carrier frequency signal 1715 to extract the information from the received carrier frequency signal 1715.

Meanwhile, the high-speed power line communication method applied to the power conversion apparatus 700 may also be applied to a power conversion module 701 or 702 shown in FIGS. 18 to 21B.

In addition, the method of varying the phase differences between the interleaving converters while varying the switching periods of the interleaving converters in the power conversion apparatus 700 as previously described may also be applied to the power conversion module 701 or 702 shown in FIGS. 18 to 21B in addition to the photovoltaic system 10 of FIG. 1.

Figure 18:
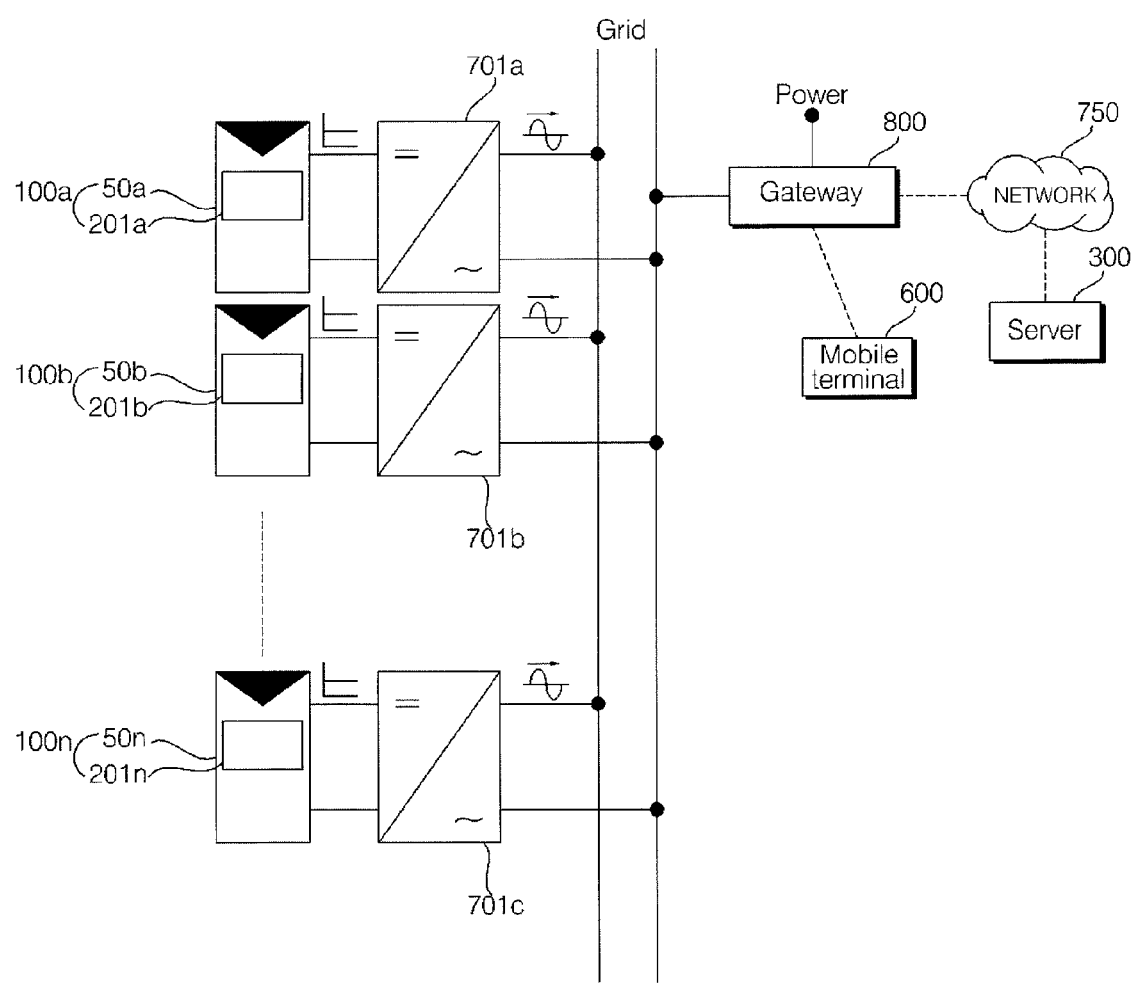
FIG. 18 is a view showing an example of the construction of a photovoltaic system according to another embodiment of the invention.

FIG. 18 is a view showing an example of the construction of a photovoltaic system according to another embodiment of the invention.

Referring to FIG. 18, the photovoltaic system 20 may include a communication device 800, a server 300 to exchange data with the communication device 800 over a network 750, and a mobile terminal 600 to exchange data with the communication device 800 or the server 300 in the same manner as in the photovoltaic system 10 of FIG. 1.

Figure 19A:
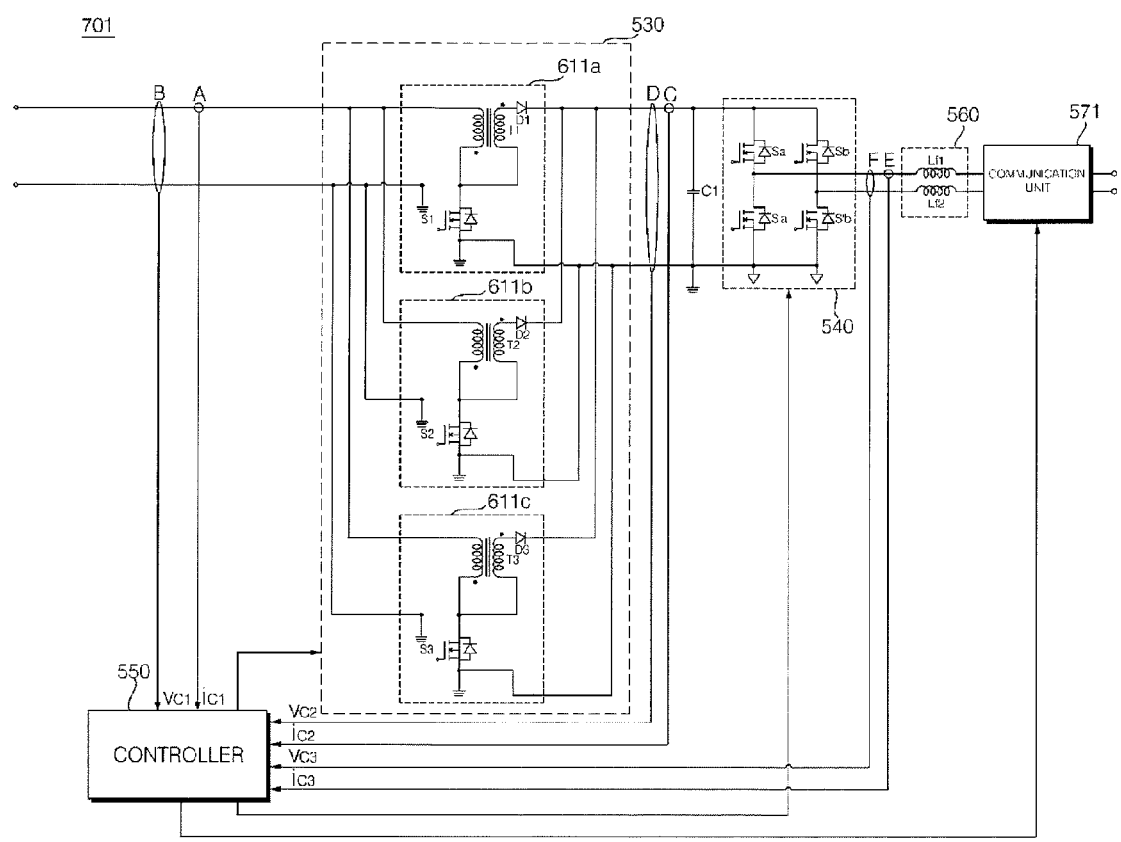
FIG. 19A is an internal circuit diagram of an example of a power conversion module shown in FIG. 18.
Figure 19B:
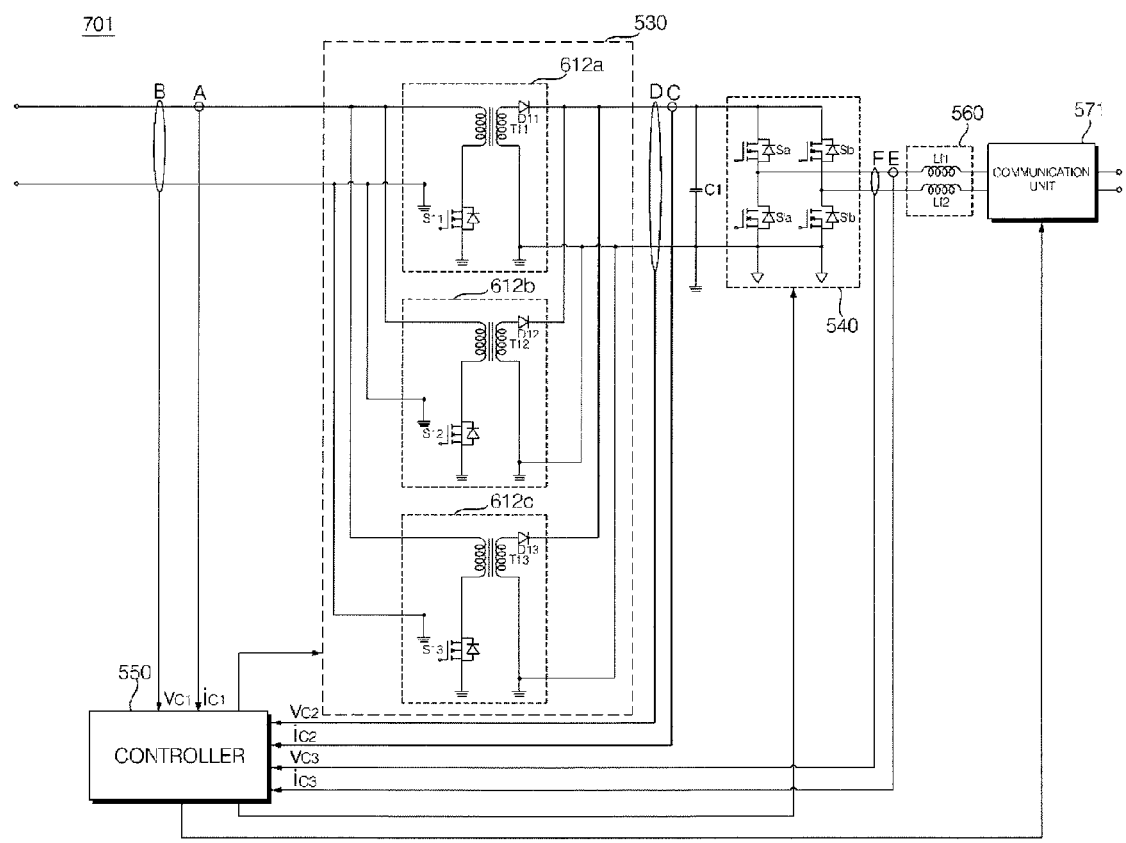
FIG. 19B is an internal circuit diagram of another example of the power conversion module shown in FIG. 18.

Meanwhile, the photovoltaic system 20 of FIG. 18 is different from the photovoltaic system 10 of FIG. 1 in that each junction box 210 includes only a bypass diode and power conversion modules 701*a*, 701*b*, . . . , and 701*n* separated from photovoltaic modules 50*a*, 50*b*, . . . , and 50*n* each include a converter unit, a controller, an inverter unit, and a communication unit 571 (see FIG. 19A or 19B).

That is, the photovoltaic modules 50*a*, 50*b*, . . . , and 50*n* may respectively include solar cell modules 100*a*, 100*b*, . . . , and 100*n* and junction boxes 201*a*, 201*b*, . . . , and 201*n* attached to rear surfaces of the solar cell modules 100*a*, 100*b*, . . . , and 100*n* to output DC voltage generated by the solar cell modules 100*a*, 100*b*, . . . , and 100*n* via the bypass diodes.

The power conversion modules 701*a*, 701*b*, . . . , and 701*n* may be electrically connected to output ends of the respective junction boxes 201*a*, 201*b*, . . . , and 201*n* to convert input DC voltage into AC voltage and to output the AC voltage.

The power conversion modules 701*a*, 701*b*, . . . , and 701*n* may be connected in parallel to one another to supply the generated AC voltage to a grid.

FIG. 19A is an internal circuit diagram of an example of the power conversion module shown in FIG. 18 and FIG. 19B is an internal circuit diagram of another example of the power conversion module shown in FIG. 18.

The power conversion module 701 of FIG. 19A is different from the power conversion module 700 of FIG. 7A in that the power conversion module 701 of FIG. 19A does not include a bypass diode unit 510.

Referring to FIG. 19A, the power conversion module 701 may include a converter unit 530, a DC end capacitor C1, an inverter unit 540, a controller 550, a filter unit 560, and a communication unit 571. Meanwhile, the converter unit 530 may include tap inductor converters as interleaving converters.

The power conversion module 701 of FIG. 19B is different from the power conversion module 700 of FIG. 7B in that the power conversion module 701 of FIG. 19A does not include a bypass diode unit 510. Meanwhile, a converter unit 530 shown in FIG. 19B may include flyback converters as interleaving converters.

Meanwhile, the communication unit 571 may add predetermined information to the noise-reduced AC voltage using a carrier frequency signal having a predetermined frequency. That is, the communication unit 571 may perform power line communication. In addition, the communication unit 571 may output the AC voltage having the information added thereto to the grid.

Figure 20:
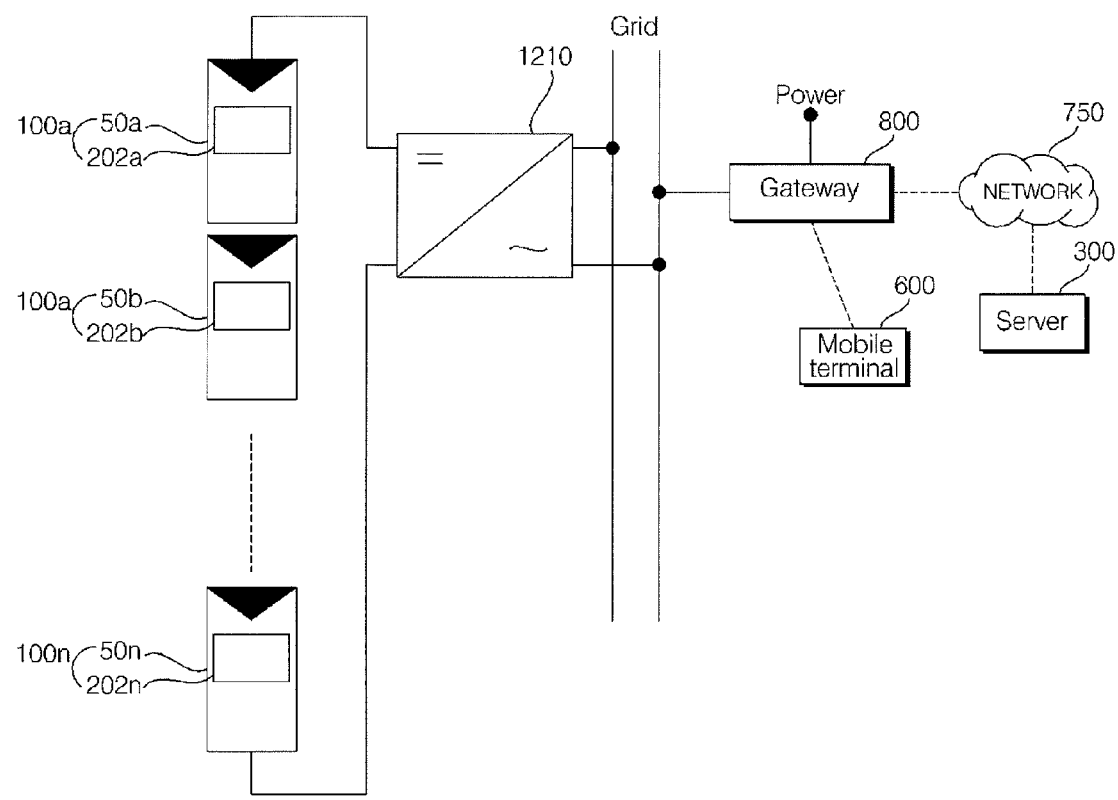
FIG. 20 is a view showing an example of the construction of a photovoltaic system according to a further embodiment of the invention.

FIG. 20 is a view showing an example of the construction of a photovoltaic system according to a further embodiment of the invention.

Referring to FIG. 20, the photovoltaic system 30 may include a communication device 800, a server 300 to exchange data with the communication device 800 over a network 750, and a mobile terminal 600 to exchange data with the communication device 800 or the server 300 in the same manner as in the photovoltaic system 10 of FIG. 1.

Meanwhile, the photovoltaic system 30 of FIG. 20 is different from the photovoltaic system 10 of FIG. 1 in that each junction box 210 includes a bypass diode, a converter unit, and a controller but does not include an inverter unit and a communication unit. The inverter unit and the communication unit are included in a power conversion module 1210. The power conversion module 1210 is separated from photovoltaic modules 50*a*, 50*b*, . . . , and 50*n*.

That is, the photovoltaic modules 50*a*, 50*b*, . . . , and 50*n* may respectively include solar cell modules 100*a*, 100*b*, . . . , and 100*n* and junction boxes 202*a*, 202*b*, . . . , and 202*n* attached to rear surfaces of the solar cell modules 100a, 100b, . . . , and 100n to power-convert DC voltage generated by the solar cell modules 100a, 100b, . . . , and 100n and to output the power-converted DC voltage. The output DC voltage may be pseudo DC voltage or boosted DC voltage.

The power conversion module 1210 may be electrically connected to output ends of the respective junction boxes 202a, 202b, . . . , and 202n to convert input DC voltage into AC voltage and to output the AC voltage. In particular, the power conversion module 1210 may add predetermined information to a carrier frequency signal to output AC voltage having the predetermined information added thereto.

The power conversion module 1210 may supply the AC voltage having the predetermined information added thereto to a grid.

Figure 21A:
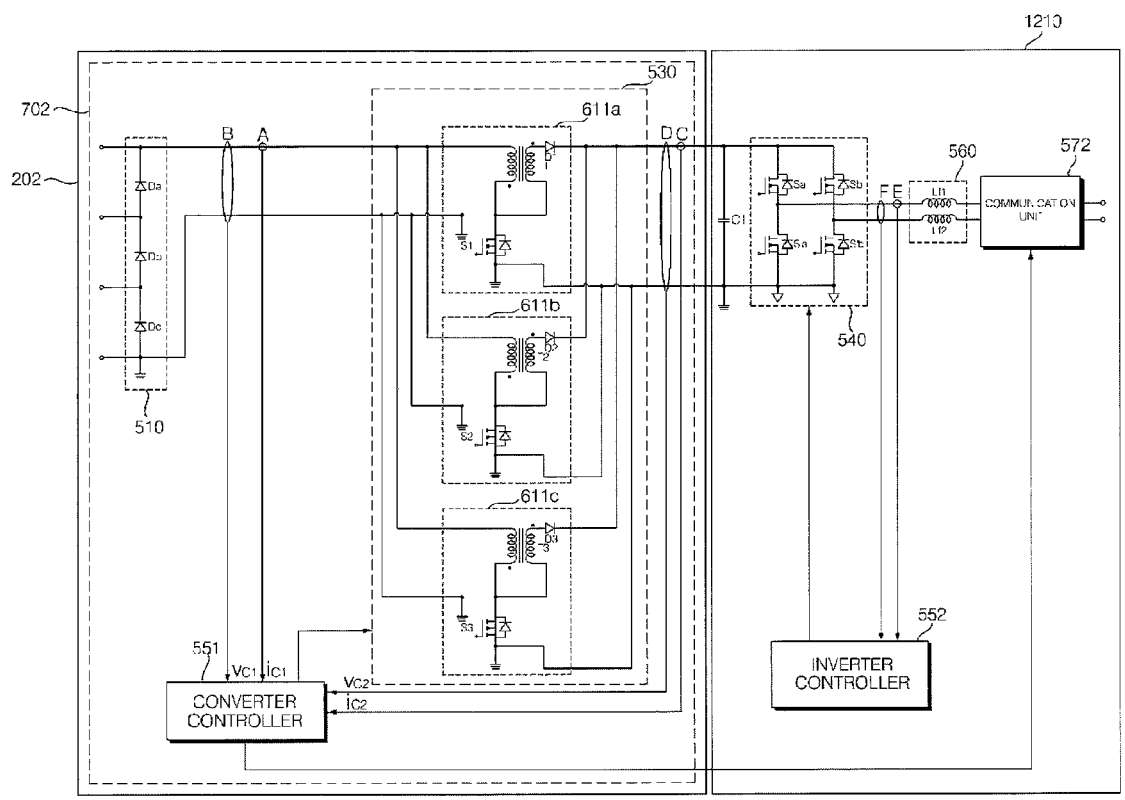
FIG. 21A is an internal circuit diagram of an example of first and second power conversion modules shown in FIG. 20.
Figure 21B:
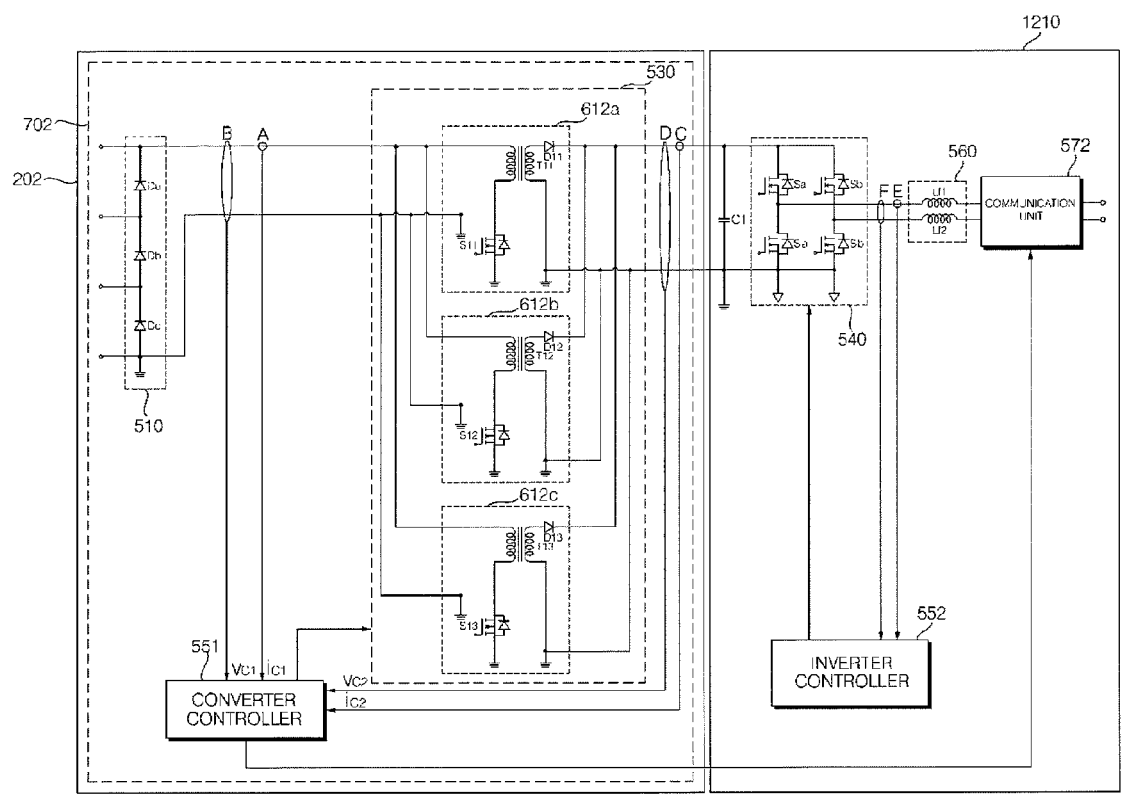
FIG. 21B is an internal circuit diagram of another example of the first and second power conversion modules shown in FIG. 20.

FIG. 21A is an internal circuit diagram of an example of first and second power conversion modules shown in FIG. 20 and FIG. 21B is an internal circuit diagram of another example of the first and second power conversion modules shown in FIG. 20.

Referring to FIG. 21A, the first power conversion module 702 may include a bypass diode unit 510, a converter unit 530, a DC end capacitor C1, and a converter controller 551 and the second power conversion module 1210 may include an inverter unit 540, an inverter controller 552, a filter unit 560, and a communication unit 572.

The converter unit 530 may include tap inductor converters as interleaving converters.

Referring to FIG. 19B, the first power conversion module 702 may include a bypass diode unit 510, a converter unit 530, a DC end capacitor C1, and a converter controller 551 and the second power conversion module 1210 may include an inverter unit 540, d an inverter controller 552, a filter unit 560, and a communication unit 572. The converter unit 530 of FIG. 21B may include flyback converters as interleaving converters.

Meanwhile, the communication unit 572 may add predetermined information to the noise-reduced AC voltage using a carrier frequency signal having a predetermined frequency. That is, the communication unit 572 may perform power line communication. In addition, the communication unit 572 may output the AC voltage having the information added thereto to the grid.

The power conversion apparatus, the photovoltaic module, and the communication device and the photovoltaic system including the same according to the embodiment of the invention may not be limitedly applied to the construction and method of the embodiments as previously described; however, all or some of the embodiments may be selectively combined to achieve various modifications.

As is apparent from the above description, according to an embodiment of the invention, a power conversion apparatus includes an inverter unit to perform AC voltage conversion based on DC voltage from a solar cell module and a communication unit to add a carrier frequency signal containing predetermined information to the converted AC voltage and output the AC voltage containing the information to a grid and, when a level of the converted AC voltage is equal to or less than a predetermined level, to add a carrier frequency signal containing information to DC voltage and output the DC voltage containing the information to the grid. Consequently, it is possible to stably transmit information to an external device.

Particularly, when AC voltage is not supplied to the grid, the information is transmitted using additional DC voltage. Consequently, it is possible to stably transmit information to the external device.

Meanwhile, the communication unit outputs the information to the grid based on a communication speed of Mbps or higher and a bandwidth of 2 to 30 MHz. Consequently, it is possible to perform high-speed data communication. As a result, the power conversion apparatus is robust to noise.

Meanwhile, the transmitted information may include at least one selected from among information regarding power generated by photovoltaic modules including solar cell modules, information regarding current input to and output from the photovoltaic modules, information regarding voltage input to and output from the photovoltaic modules, information regarding operation states of the photovoltaic modules, and information regarding errors of the photovoltaic modules. Consequently, it is possible to transmit various kinds of information.

Meanwhile, the communication unit may perform one-way communication and, therefore, the power conversion apparatus may be simply configured.

According to another embodiment of the invention, a communication device includes a first communication unit to receive AC voltage having information regarding photovoltaic power added thereto through a grid, a memory to store the information regarding photovoltaic power, information regarding current and voltage of a power conversion module connected to a solar cell module, and information regarding a state of the grid, and a second communication unit to output monitoring information including at least one selected from among the information regarding photovoltaic power, the information regarding current and voltage of the power conversion module, and the information regarding the state of the grid to an external device. Consequently, it is possible to store and output the monitoring information.

In addition, the communication device may further include an output unit to output the monitoring information. Consequently, it is possible for a user to easily and conveniently check the monitoring information regarding the photovoltaic module.

Meanwhile, the first communication unit receives AC voltage having photovoltaic information added thereto from the grid based on a communication speed of 1 Mbps or higher and a bandwidth of 2 to 30 MHz. Consequently, it is possible to perform high-speed data communication. As a result, the communication device is robust to noise.

According to a further embodiment of the invention, a photovoltaic system includes a solar cell module, a power conversion module, and a communication device. The communication device stores and outputs information regarding photovoltaic power generated by the solar cell module. Consequently, it is possible to improve user convenience.

Meanwhile, the power conversion apparatus may further include a converter unit including a plurality of interleaving converters. Switching periods of the interleaving converters are changed and differences between operation sections of the interleaving converters, i.e. phase differences between the interleaving converters, are changed in response to change of the switching periods of the interleaving converters, thereby preventing instantaneous reduction of output power due to change of switching frequencies of the interleaving converters.

Furthermore, the interleaving converters perform interleaving operation to reduce a ripple of input current and output current of a converter unit. As a result, the capacity and size of circuit devices in a power conversion module may be reduced.

According to the embodiment of the invention, on the other hand, a converter unit may output pseudo DC voltage. To this end, the switching frequencies of the interleaving converters may be changed. Consequently, it is possible to output pseudo DC voltage more approximate to a sine wave.

The photovoltaic module may be configured such that a junction box, which has a power conversion module including a converter unit including a plurality of interleaving converters and an inverter unit, is attached to the rear surface of the solar cell module. Consequently, it is possible to directly stably output AC voltage from the photovoltaic module.

Although the example embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A power conversion apparatus comprising:
    a converter unit to convert direct current (DC) voltage from a solar cell module, the converter unit comprising a plurality of interleaving converters;
    an inverter unit to perform alternating current (AC) voltage conversion based on converted DC voltage from the converter unit;
    a controller to control the inverter unit; and
    a communication unit to add a carrier frequency signal containing predetermined information to the converted AC voltage and output the AC voltage containing the predetermined information to a grid and, when a level of the converted AC voltage is equal to or less than a predetermined level, to add the carrier frequency signal containing the predetermined information to DC voltage having a first level and output the DC voltage containing the predetermined information to the grid,
    wherein the controller changes switching periods of the interleaving converters and changes differences between operation sections of the interleaving converters, including phase differences between the interleaving converters, while varying the switching periods of the interleaving converters, and
    wherein when the switching periods of the interleaving converters are increased, the controller changes the phases of the interleaving converters such that the phase differences between the interleaving converters are decreased.

2. The power conversion apparatus according to claim 1, wherein the communication unit performs one-way communication to transmit the predetermined information to the grid.

3. The power conversion apparatus according to claim 1, wherein the predetermined information comprises at least one selected from among information regarding power generated by a photovoltaic module including the solar cell module, information regarding current input to and output from the photovoltaic module, information regarding voltage input to and output from the photovoltaic module, information regarding an operation state of the photovoltaic module, and information regarding an error of the photovoltaic module.

4. The power conversion apparatus according to claim 1, wherein the communication unit outputs the predetermined information to the grid based on a communication speed of 1 Mbps or higher and a bandwidth of 2 to 30 MHz.

5. The power conversion apparatus according to claim 1, wherein the communication unit outputs the predetermined information to the grid through orthogonal frequency division multiplexing (OFDM).

6. The power conversion apparatus according to claim 1, wherein, when the converted AC voltage is not output from the inverter unit, the communication unit adds the carrier frequency signal containing the predetermined information to the DC voltage having the first level and outputs the DC voltage containing the predetermined information to the grid.

7. The power conversion apparatus according to claim 6, wherein the first level has a level of 0.

8. The power conversion apparatus according to claim 1, further comprising:
    at least one bypass diode to receive the DC voltage from the solar cell module,
    wherein the converter unit power-converts the DC voltage from the at least one bypass diode, and
    the power conversion apparatus is provided in a junction box attached to a rear surface of the solar cell module.

9. The power conversion apparatus according to claim 8, wherein the converter unit power-converts the DC voltage from the bypass diode to output a pseudo DC voltage.

10. The power conversion apparatus according to claim 1, wherein when the switching periods of the interleaving converters are increased, the controller changes the phases of the interleaving converters such that the operation sections of the interleaving converters are overlapped.

11. A photovoltaic module comprising:
    a solar cell module comprising a plurality of solar cells; and
    a junction box attached to a rear surface of the solar cell module, the junction box comprising a power conversion module to power-convert DC voltage supplied from the solar cell module and to output the power-converted DC voltage,
    wherein the power conversion module comprises:
    at least one bypass diode to receive the DC voltage from the solar cell module;
    a converter unit to convert the DC voltage from the at least one bypass diode, the converter unit comprising a plurality of interleaving converters;
    an inverter unit to output AC voltage using the converted DC voltage;
    a controller to control the inverter unit; and
    a communication unit to add a carrier frequency signal containing predetermined information to the AC voltage and output the AC voltage containing the information to a grid and, when a level of the converted AC voltage is equal to or less than a predetermined level, to add the carrier frequency signal containing the predetermined information to DC voltage having a first level and output the DC voltage containing the predetermined information to the grid,
    wherein the controller changes switching periods of the interleaving converters and changes differences between operation sections of the interleaving converters, including phase differences between the interleaving converters, while varying the switching periods of the interleaving converters, and
    wherein when the switching periods of the interleaving converters are increased, the controller changes the phases of the interleaving converters such that the phase differences between the interleaving converters are decreased.

12. A photovoltaic system comprising:
    a solar cell module comprising a plurality of solar cells;
    a power conversion module to power-convert DC voltage supplied from the solar cell module into AC voltage and to output the AC voltage; and a communication device comprising a first communication unit to receive AC voltage having information regarding photovoltaic power added thereto through a grid, a memory to store the information regarding the photovoltaic power, information regarding current and voltage of the power conversion module, and information regarding a state of the grid, and a second communication unit to output monitoring information comprising at least one selected from among the information regarding the photovoltaic power, the information regarding the current and voltage of the power conversion module, and the information regarding the state of the grid to an external device, wherein the power conversion module comprises:

at least one bypass diode to receive the DC voltage from the solar cell module;

a converter unit to convert the DC voltage from the at least one bypass diode, the converter unit comprising a plurality of interleaving converters;

an inverter unit to output AC voltage using the converted DC voltage;

a controller to control the inverter unit; and a communication unit to add the information regarding the photovoltaic power to the AC voltage and to output the AC voltage having the information regarding the photovoltaic power added thereto, wherein the controller changes switching periods of the interleaving converters and changes differences between operation sections of the interleaving converters, including phase differences between the interleaving converters, while varying the switching periods of the interleaving converters, and wherein when the switching periods of the interleaving converters are increased, the controller changes the phases of the interleaving converters such that the phase differences between the interleaving converters are decreased.

13. The photovoltaic system according to claim 12, wherein the power conversion module adds a carrier frequency signal containing predetermined information to the converted AC voltage and outputs the AC voltage containing the predetermined information to the grid and, when a level of the converted AC voltage is equal to or less than a predetermined level, adds the carrier frequency signal containing the predetermined information to DC voltage having a first level and outputs the DC voltage containing the predetermined information to the grid.

14. The photovoltaic system according to claim 12, wherein the first communication unit further receives the information regarding the current and voltage of the power conversion module connected to the solar cell module and the information regarding the state of the grid, and the first communication unit further receives the DC voltage having the information regarding the photovoltaic power added thereto through the grid.

15. The photovoltaic system according to claim 12, wherein the first communication unit receives the AC voltage having the information regarding the photovoltaic power added thereto based on a communication speed of 1 Mbps or higher and a bandwidth of 2 to 30 MHz.

* * * * *